Figure 3C:
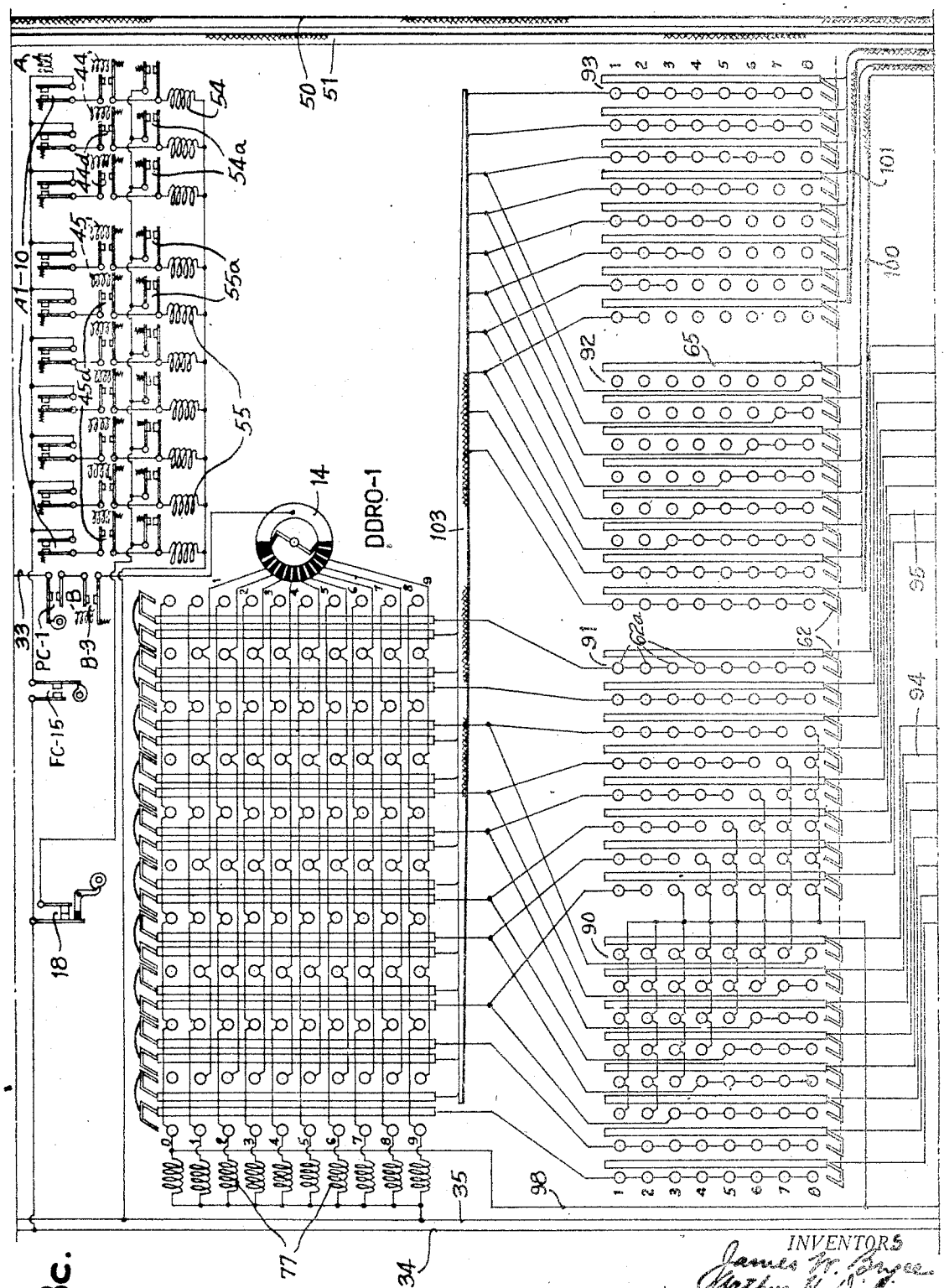

July 11, 1939.   J. W. BRYCE ET AL   2,165,220
CALCULATING MACHINE FOR EFFECTING DIVISION
Filed June 29, 1934   11 Sheets-Sheet 1
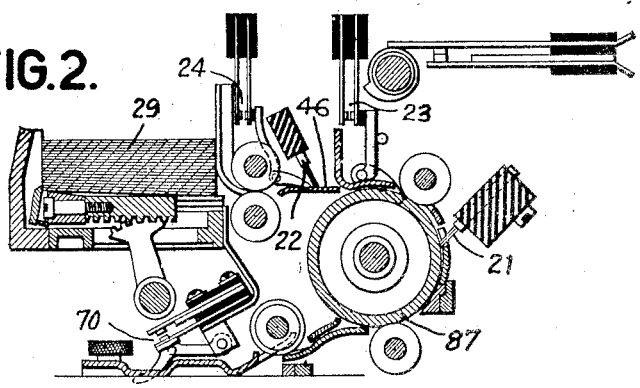
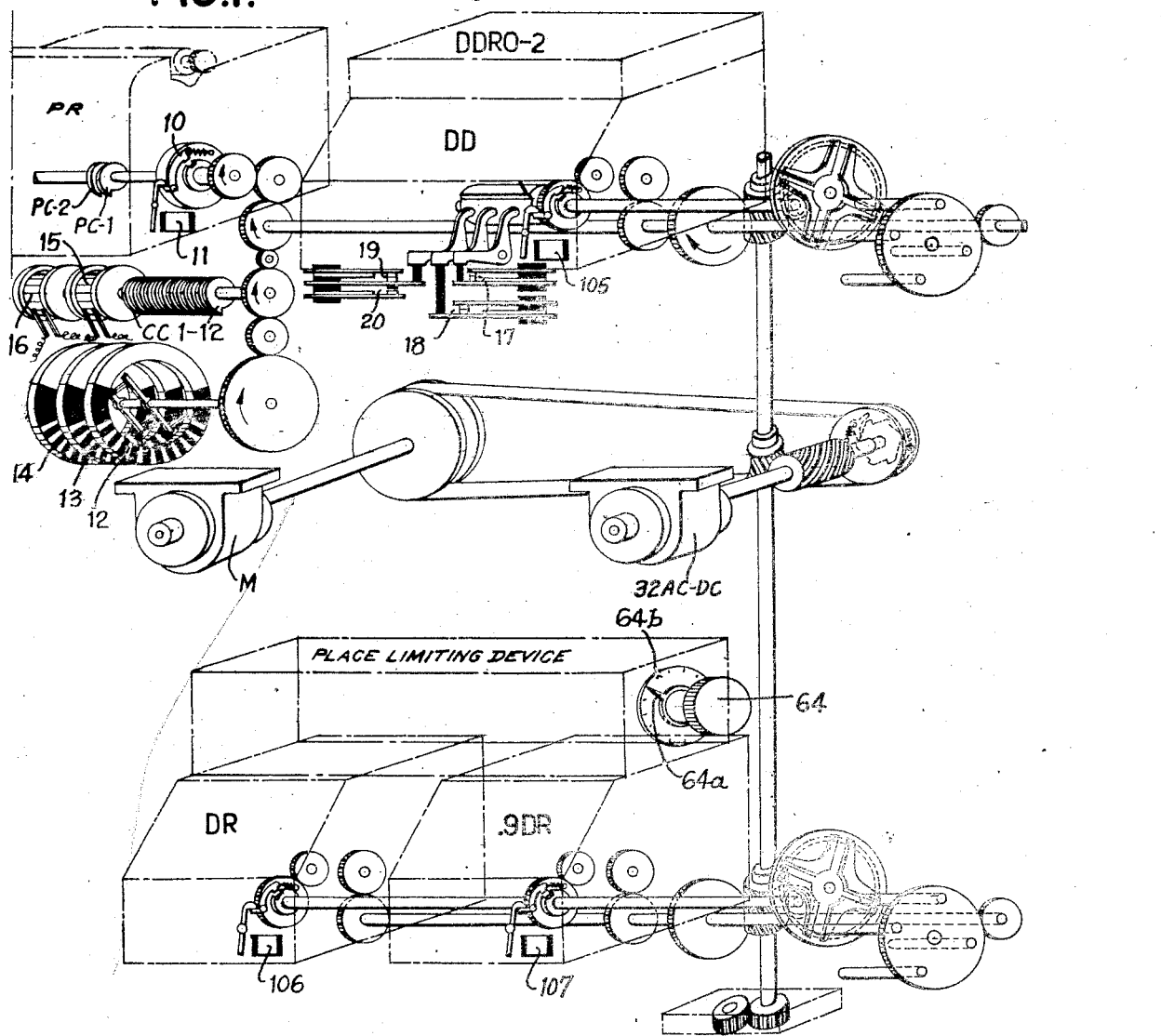

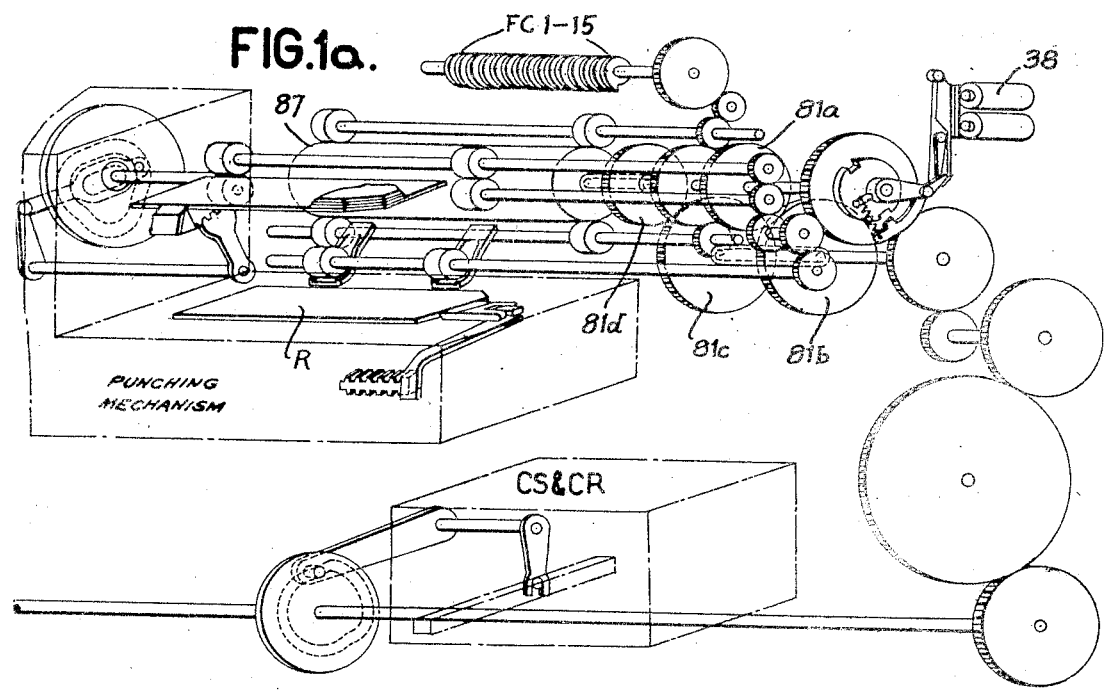
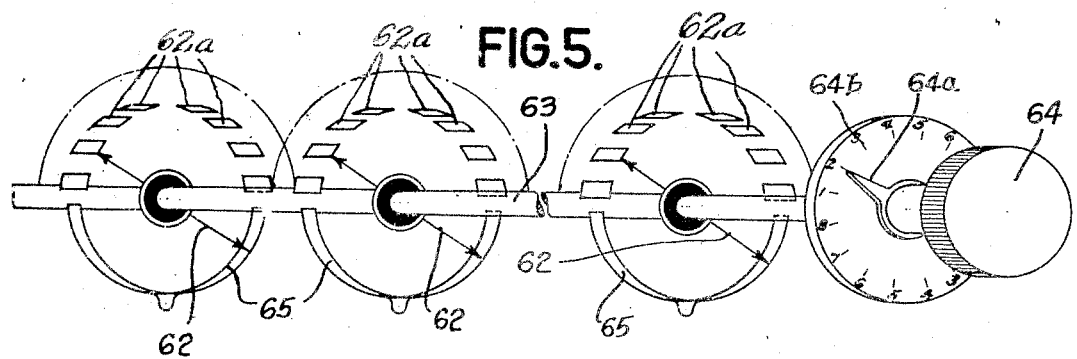

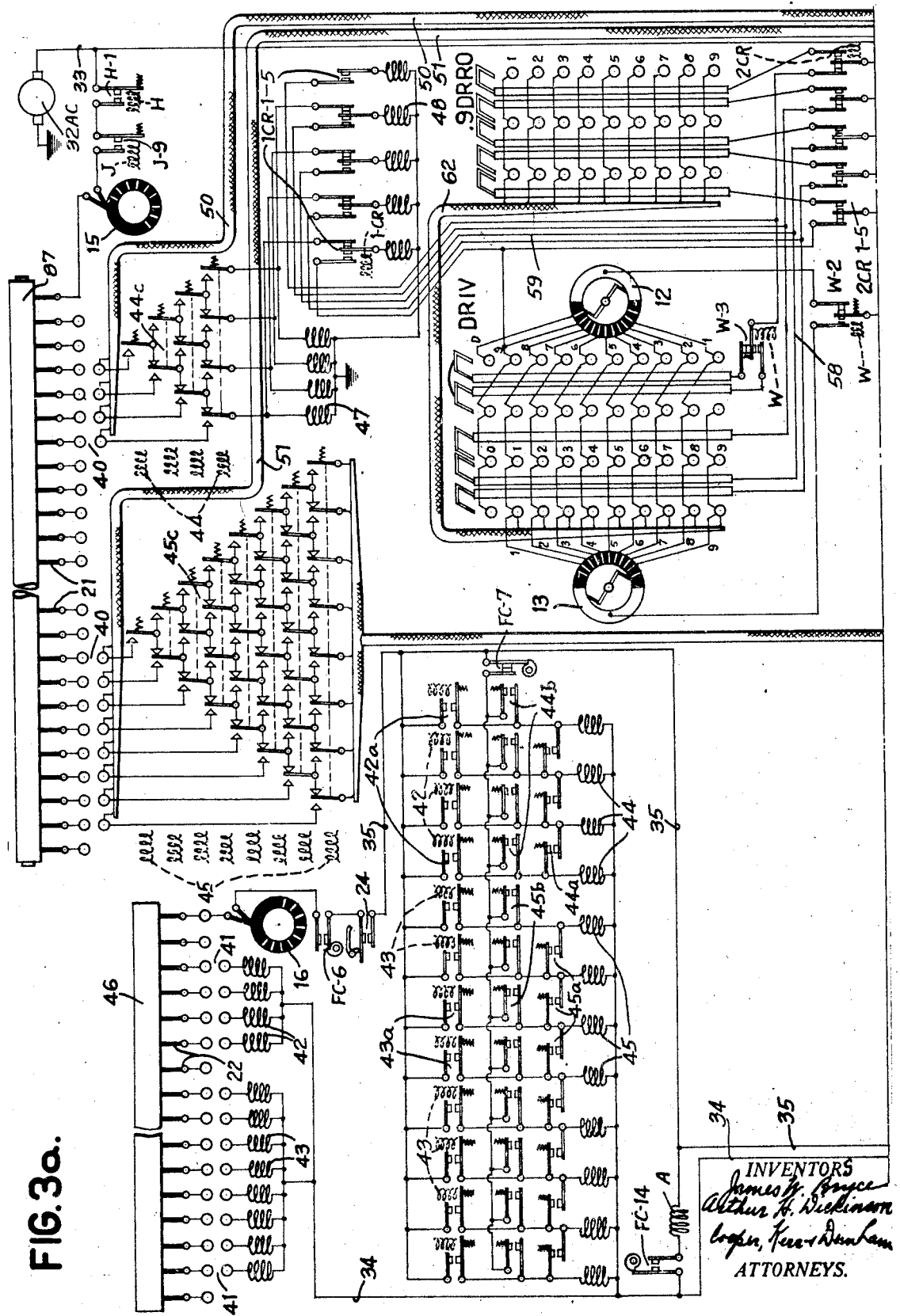

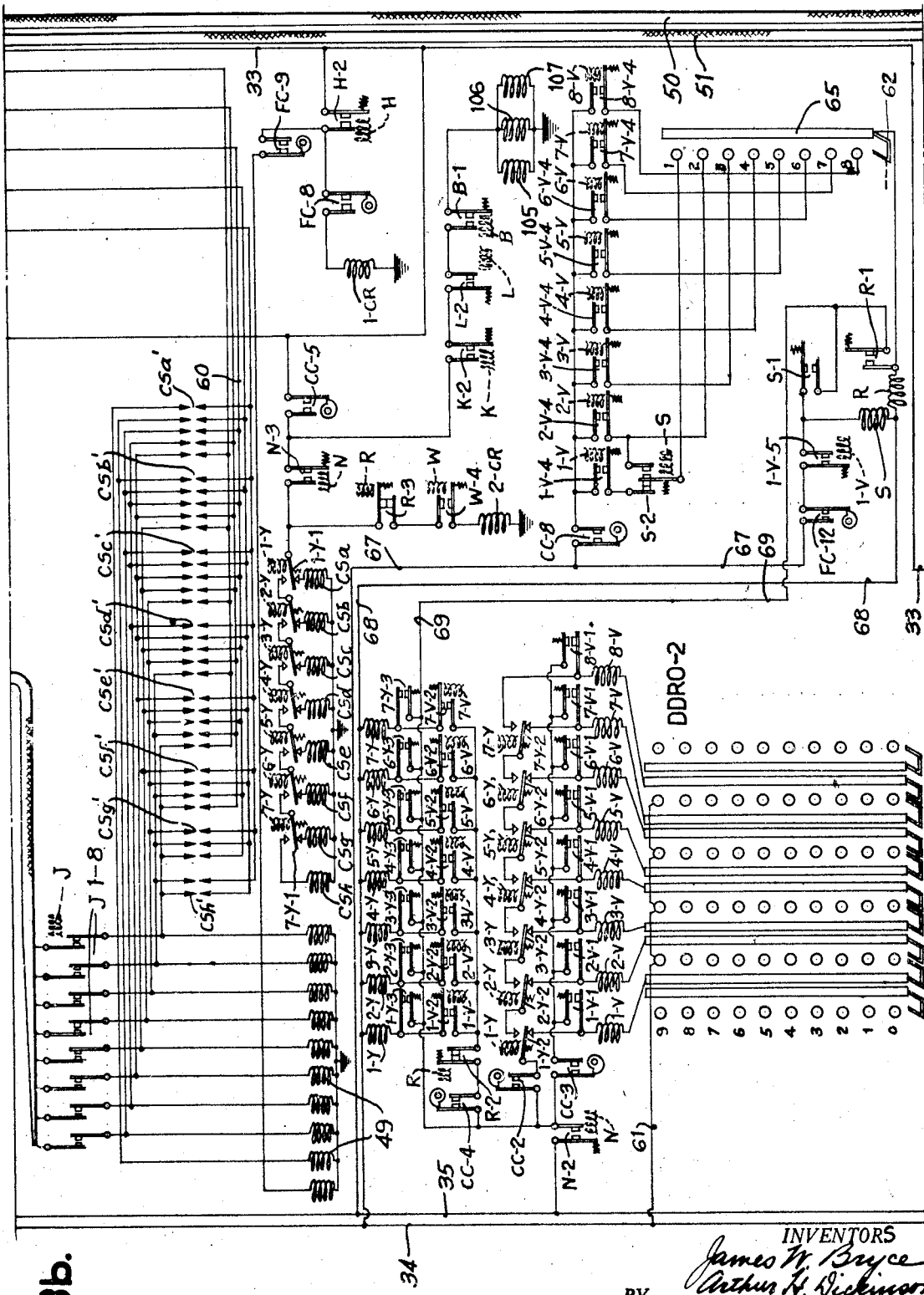

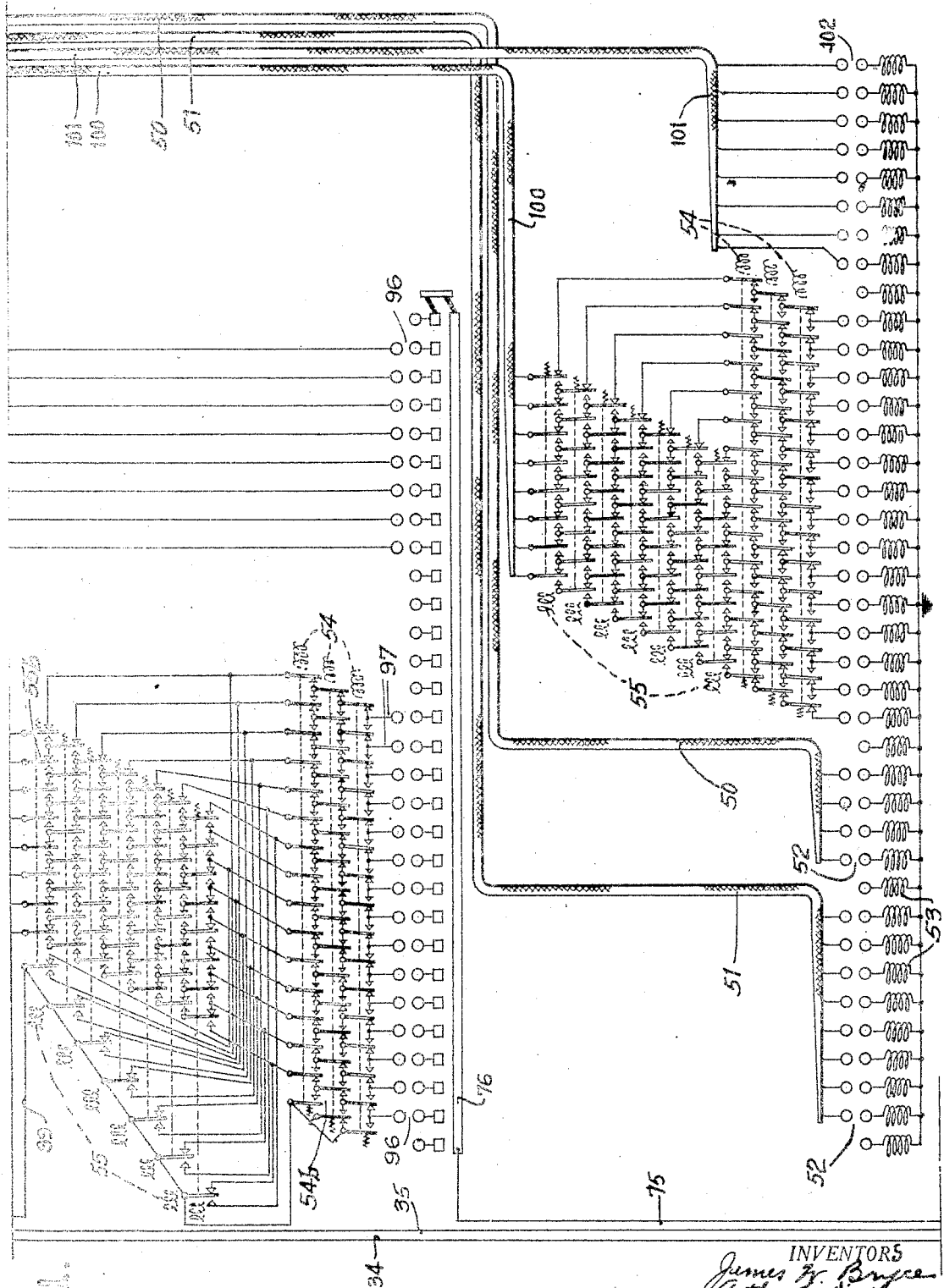

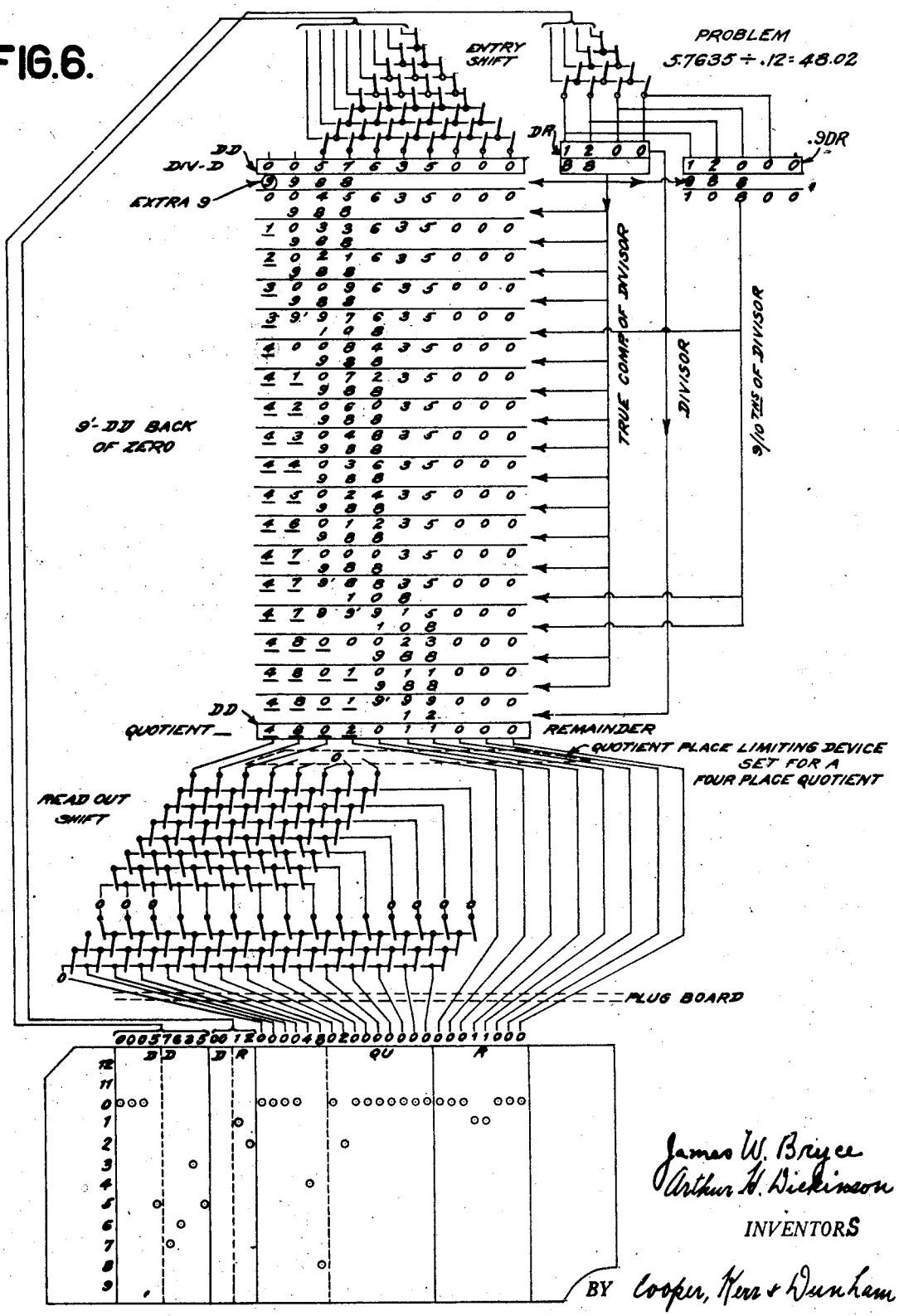

July 11, 1939.   J. W. BRYCE ET AL   2,165,220
CALCULATING MACHINE FOR EFFECTING DIVISION
Filed June 29, 1934   11 Sheets-Sheet 11

INVENTORS
James W. Bryce
Arthur H. Dickinson
BY Cooper, Kerr & Dunham
ATTORNEYS.

Patented July 11, 1939

2,165,220

UNITED STATES PATENT OFFICE 2,165,220

CALCULATING MACHINE FOR EFFECTING DIVISION

James W. Bryce, Bloomfield, N. J., and Arthur H. Dickinson, Brooklyn, N. Y., assignors to International Business Machines Corporation, New York, N. Y., a corporation of New York Application June 29, 1934, Serial No. 733,076

23 Claims. (Cl. 235—61.8)

This invention relates to improvements in division machines for computing quotients and remainders from dividend and divisor factor data.

With previous division machines the dividend and divisor are first entered into the machine, thereafter subtraction is started, the divisor being subtracted from the dividend beginning the subtraction in the highest possible orders of the dividend. Subtraction continues in that order until the result of the dividend accumulator passes through zero or goes back of zero. Then the customary procedure is to add back the divisor once into the dividend accumulator, thereafter the divisor is shifted over one place relatively to the right and the above subtraction operation is repeated. A quotient counter is customarily provided to keep count of the number of subtracting operations in each denominational order and this subtracting counter also subtracts 1 when the divisor amount is reintroduced into the dividend accumulator. This process proceeds for the various denominational orders of the dividend until the capacity of the machine is reached or until as many places are set up in the quotient counter as are desired. If an amount then remains in the dividend accumulator this is the remainder.

Various proposals have been made to shorten up these operations, but none of them materially speed up the operation.

According to the present invention upon going back of zero in lieu of reintroducing the divisor into the dividend accumulator, then effecting a column shift and then subtracting the divisor from the dividend accumulator a different course of procedure is followed. Upon going back of zero, column shift is effected and thereupon there is introduced into the dividend accumulator an amount which is nine-tenths of the divisor. By introducing nine-tenths of the divisor in shifted over columnar relation the effect is exactly the same as adding back the divisor and then shifting over and subtracting the divisor, i. e., in one cycle the same numerical result is obtained as heretofore required two cycles. This will be clear from the following table which shows the old method in contrast to the new method for a typical computation of 57635 divided by 12.

Problem
57635÷12

```
                  Old method                           New method
                    57635                                57635       12
                 1 ←—12                                  —12        —12
                 ─────                                   ─────
                    45635                                45635      108
                 2 ←—12                              1  ←—12
                 ─────                                   ─────
                    33635                                33635
                 3 ←—12                              2  ←—12
                 ─────                                   ─────
                    21635                                21635
                 4 ←—12                              3  ←—12
                 ─────                                   ─────
                    09635                                09635
                 5 ←—12                              3  ←—12
                 ─────                                   ─────
Back of zero        997635                               997635
Add back 12      4 ←+12                          ┌→4 ←+108
                 ─────          ┐Combined        │  ─────
                    009635      │ cycle          │     008435
Shift           41 ←—12         ┘               41 ←—12
                 ─────                                   ─────
                    008435                               007235
                42 ←—12                             42 ←—12
                 ─────                                   ─────
                    007235                               006035
                43 ←—12                             43 ←—12
                 ─────                                   ─────
                    006035                               004835
                44 ←—12                             44 ←—12
                 ─────                                   ─────
                    004835                               003635
                45 ←—12                             45 ←—12
                 ─────                                   ─────
                    003635                               002435
                46 ←—12                             46 ←—12
                 ─────                                   ─────
                    002435                               001235
                47 ←—12                             47 ←—12
                 ─────                                   ─────
                    001235                               000035
                48 ←—12                             47 ←—12
                 ─────                                   ─────
                    000035                               998835
                49 ←—12                        ┌→47 ←+108
                 ─────                         │  ─────
Back of zero        998835                     │         999915
Add back 12     48 ←+12                        │→480 ←+108
                 ─────         ┐ Combined      │  ─────
                    000035     │ cycle         │     000023
Shift          481 ←—12        ┘              4801 ←—12
                 ─────                                   ─────
Back of zero        999915                               000011
Add back 12    480 ←+12                             4801 ←—12
                 ─────         ┐ Combined                ─────
                    000035     │ cycle                   999999
Shift         4801 ←—12        ┘              4802 ←+12
                 ─────                                   ─────
                    000023                               000011
              4802 ←—12
                 ─────
                    000011
              4803 ←—12
                 ─────
Back of zero        999999
Add back 12   4802 ←+12
                 ─────
                    000011
```

From the foregoing comparative table, it will be seen that the new method saves one complete machine cycle every time there is a going back of zero operation required.

According to the preferred embodiment of the invention, the present machine effects subtraction by complemental addition in place of effecting it by direct subtraction. Thus an illustrative computation would be as follows:

```
  57635
    968
 ------
 045635
    968
 ------
 032635
```

Previous machines have also required in addition to the dividend accumulator a quotient counter or receiving device into which the quotient is entered as formed.

According to the present invention the quotient counter is dispensed with entirely and the quotient is entered into the left hand part of the dividend accumulator as the dividend is progressively diminished by subtracting operations. Parts of the quotient are furthermore entered in in columns of the dividend accumulator which at the beginning of the computation were occupied by the dividend itself. The dividend accumulator thus assumes a dual role. It starts out as a dividend accumulator alone and as the computation proceeds, parts of it become the quotient counter and other parts constitute a remainder device.

The steps which the machine performs in a particular computation in dividing 57635 by 12 and the manner in which the successive digits appear will be clear from the following table.

```
 Dividend       Divisor       .9 Divisor
||||||||||       ||||           ||||
0057635000       12             12
  998800  <-------------------  98800
0045635000       .9 of 12       10800
   98800
1033635000
  -98800
2021635000
  -98800
3009635000
  -98800
3997635000
-  10800
4008435000
-  98800
4107235000
-- 98800
4206035000
-- 98800
4304835000
-- 98800
4403635000
-- 98800
4502435000
-- 98800
4601235000
-- 98800
4700035000
-- 98800
4798835000
--  10800
4799915000
--  10800
4800023000
--  98800
4801011000
---- 98800
4801999000
----  1200
4802011000
```

In the foregoing table the short vertical lines under Dividend represent the columnar positions of the dividend accumulator. The vertical lines under Divisor indicate the columnar positions of the divisor entry device. The vertical lines under .9 Divisor indicate the columnar positions of the divisor entry receiving device. The table also shows the manner in which the .9 divisor is formed, that is, it is formed by adding to the divisor of 12 the 10s true complement thereof in shifted over columnar position. In the foregoing table the underlined numerals to the left indicate the quotient, that is progressively created. The prime 9's indicated thus —9'—indicate that the dividend accumulator has gone back of zero and whenever the dividend accumulator goes back of zero .9 of the divisor is entered into the dividend accumulator in shifted columnar relation.

According to the present invention provision is made for relatively evaluating the dividend and divisor and for carrying out a divisional computation according to a pre-selected number of quotient places which may be set up in advance by the operator. The computation will be carried out to the pre-selected number of places or one less than the pre-selected number depending upon whether or not the divisor goes into the dividend in the first place.

The present invention has for one of its objects the provision of an improved automatic division machine wherein quotients and remainders may be obtained automatically by the operation of the machine.

A further object of the present invention resides in the provision of a record controlled division machine in which the divisor and dividend may be automatically read from a record, automatically divided by the operation of the machine and the result or results automatically recorded.

A further object of the present invention resides in the provision of result recording means for recording the result or results upon the record from which the divisor and dividend were derived.

A further object of the present invention resides in the provision of a machine for providing a recorded statement which consists of dividend, divisor, quotient and remainder.

A further object of the present invention resides in the provision of means for speeding up the operation of a division machine by providing novel means for handling back of zero operations to the general end that extra machine cycles heretofore attendant upon back of zero operations may be eliminated.

A further object of the present invention resides in the provision of means enabling the machine to utilize the dividend counter or entry device as the quotient counter or entry device thereby eliminating the necessity of a special quotient counter.

A further object of the present invention resides in the provision of an automatically operating division machine which will operate and compute division problems automatically without manual intervention.

A further object of the present invention resides in the provision of improved means for controlling the operation of the division machine for computing a quotient to a pre-selected number of quotient places.

A further object of the present invention resides in the provision of improved means for correlating the location of result recording automatically according to the relative evaluation of the dividend and divisor and automatically by the operation of the machine.

A further object of the present invention resides in the provision of improved controls for division machines to enable the machine to function in a more speedy manner than heretofore and to provide for diverse machine operations which are involved in divisional computations with the minimum of operator's attention or control.

A further object of the present invention resides in the provision of a division machine which will successively perform a succession of separate division problems without manual intervention and thereby effect division of a plurality of separate and distinct computations more rapidly than heretofore possible.

A further object of the present invention resides in the provision of an automatic division machine with improved controls to automatically determine the going back of zero in the machine and for automatically controlling subsequent machine operations accordingly without the manual intervention of the operator.

Generally stated the objects of the present invention comprise the improvement of division machines in general; the improvement of division machines to the general end that operations may be effected automatically by machine operations that heretofore required the attention of the operator; the improvement of division machines so that division results may be recorded automatically with one result recorded after another automatically with all computations and recording operations effected without manual intervention; the improvement of division machines to the general end that the machine may operate without the loss of time which heretofore existed in such machines; and to the general end that a machine be provided accomplishing functions and results not heretofore attainable, all of which will be more fully set forth in the accompanying specification and drawings of one and a preferred embodiment of the invention.

Further and other objects of the present invention will be hereinafter set forth in the accompanying specification and claims and shown in the drawings which show by way of illustration a preferred embodiment and the principle thereof and what we now consider to be the best mode in which we have contemplated of applying that principle. Other embodiments of the invention employing the same or equivalent principle may be used and structural changes made as desired by those skilled in the art without departing from the present invention and within the spirit of the appended claims.

Figure 4:
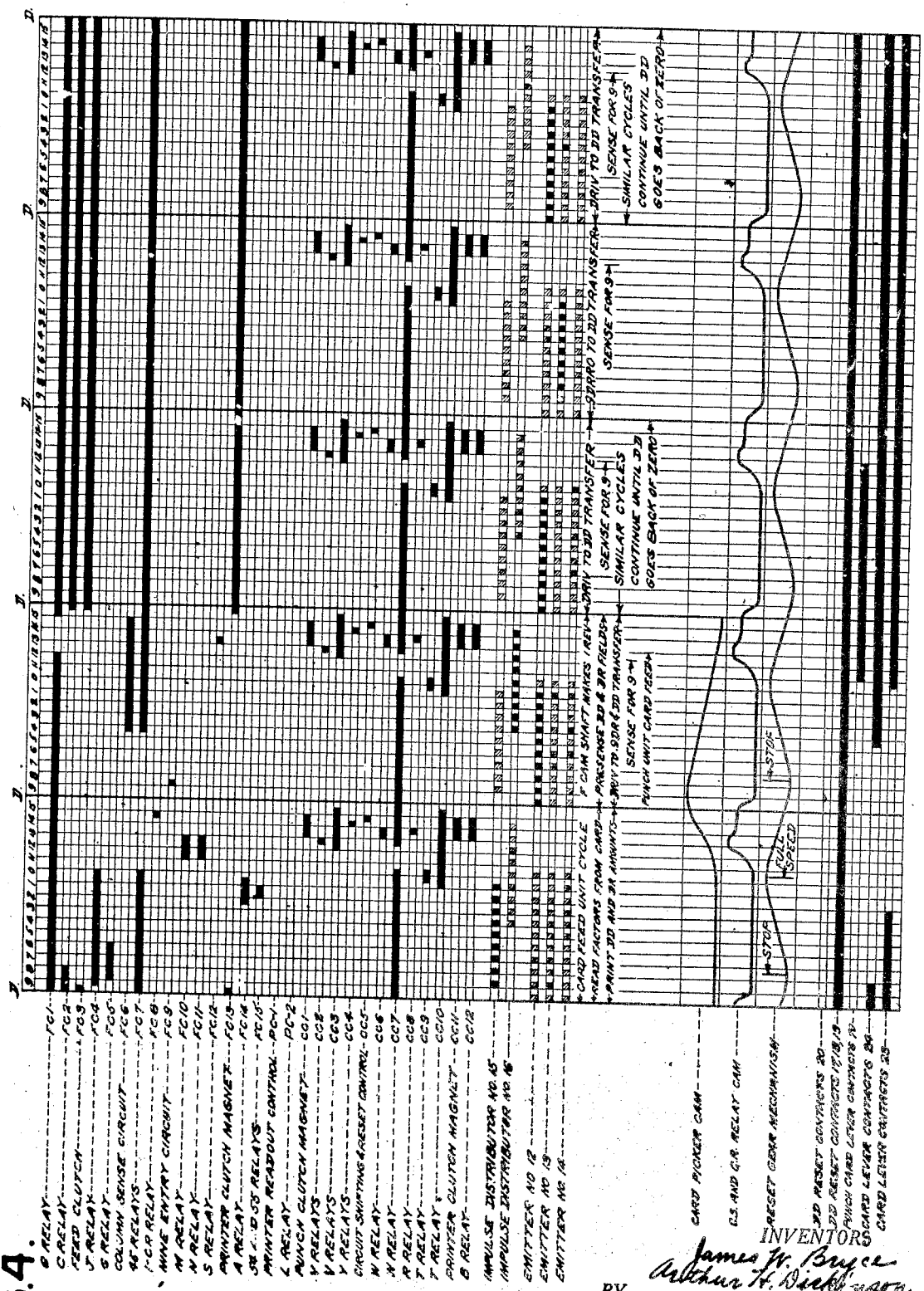
Figure 4A:
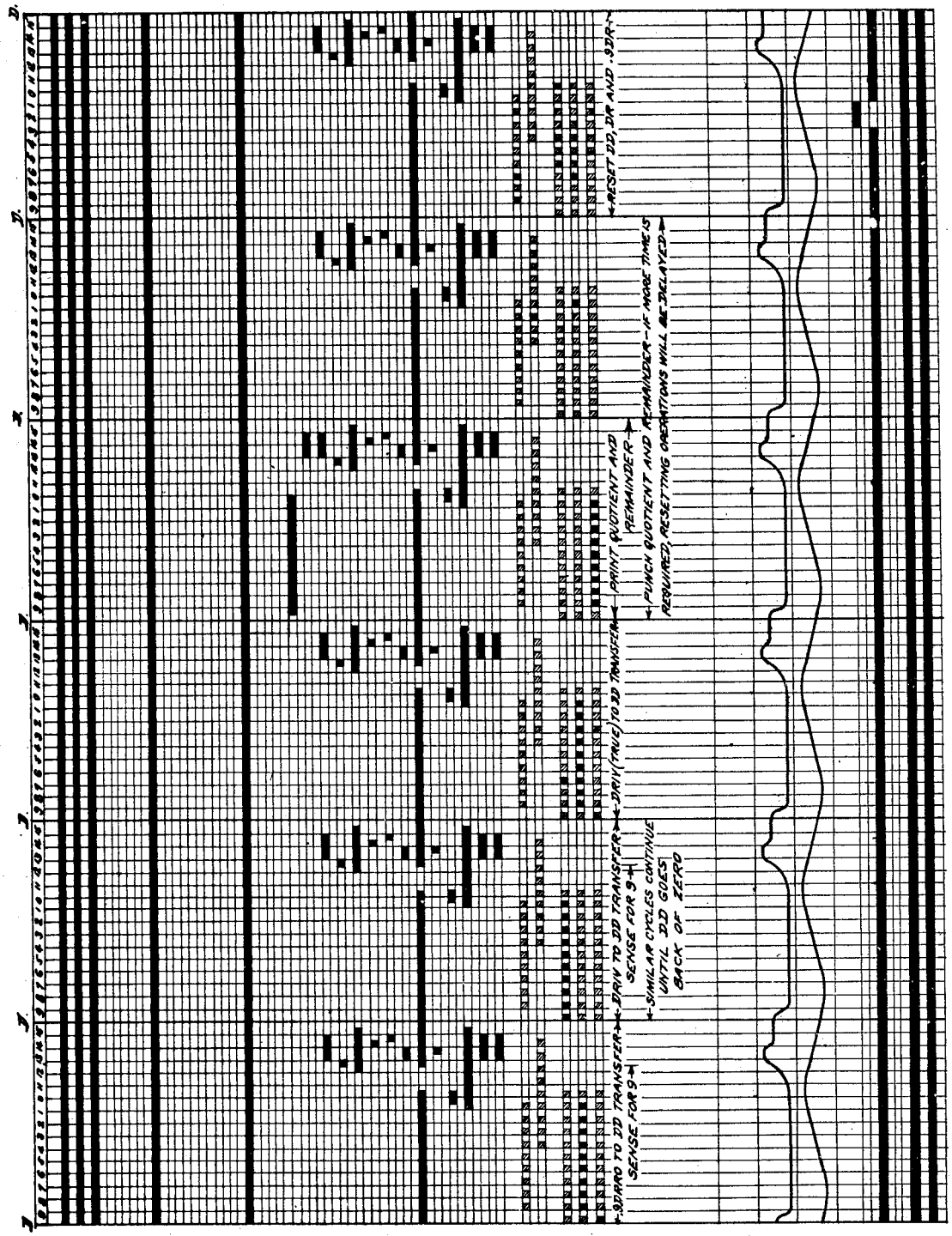

In the drawings:

Figures 1 and 1a, taken together, show somewhat diagrammatically the driving mechanism of the machine and the various sections thereof;

Fig. 2 is a cross-sectional view of the card feed, card handling and sensing section of the machine;

Figs. 3a, 3b, 3c, 3d and 3e, taken together and arranged vertically in the order named, show the circuit diagram of the machine;

Figs. 4 and 4a, taken together, show the timing diagram of the machine;

Fig. 5 shows a detail of the quotient place switching mechanism; and

Figure 7:
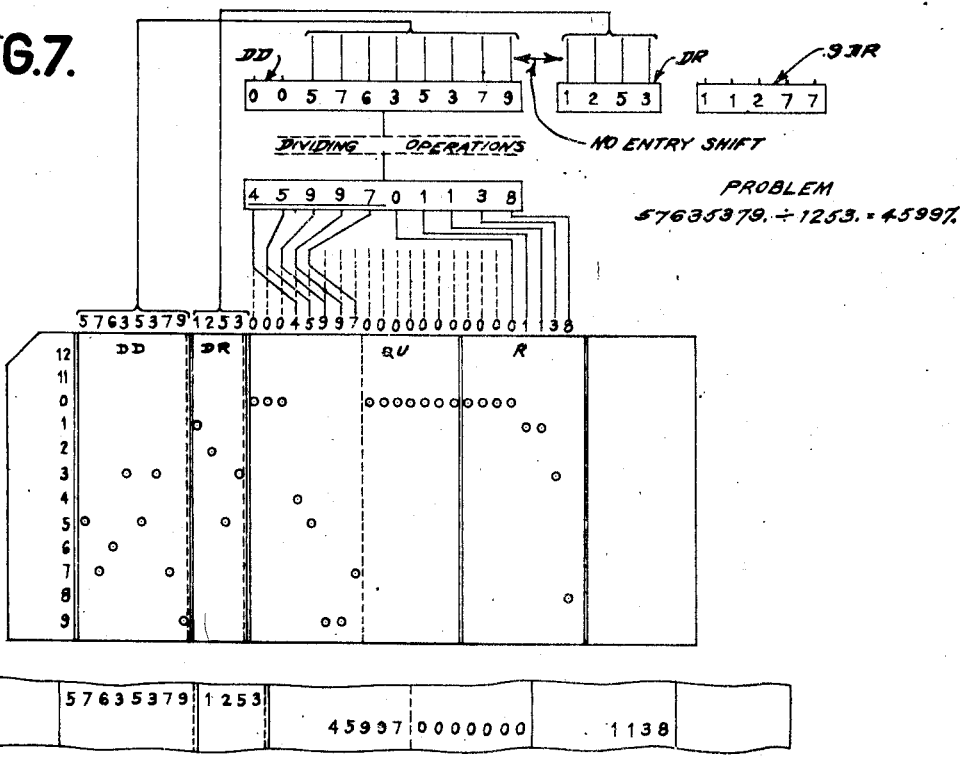
Figure 8:
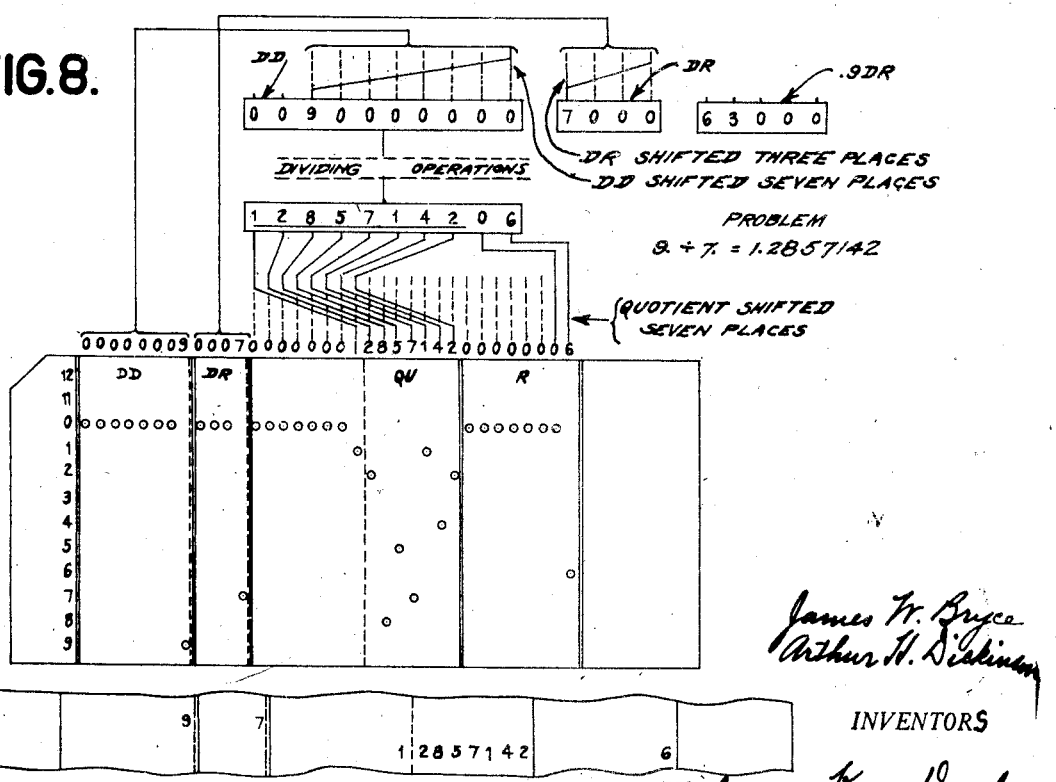

Figs. 6, 7 and 8 are views showing typical computations as performed by the machine. Fig. 6 shows a typical computation as performed by the machine and the manner in which the amounts are entered into the dividend accumulator and divisor entry receiving device, the creation of the nine-tenths divisor factor, the successive subtracting operations and the shift of the entry of the dividend and divisor upon entry and the shift back of the quotient in recording the quotient and remainder results upon the record card. Figs. 7 and 8 show in a somewhat more abbreviated manner than shown in Fig. 6, other computations performed by the machine. Fig. 7 shows an operation where there is no shift of the divisor and dividend upon entry, in which case, according to the law of the present machine, there is a back shift of the quotient of three places upon recording the result. Fig. 8 shows another computation wherein there is an entry shift of the divisor and dividend upon entry and a corelated back shift upon reading out the quotient.

Before describing the construction of the machine to which the present invention is shown applied, the general principles under which the machine operates and the general mode of operation will be set forth.

According to the present invention the machine carries out division in the following manner. The dividend and divisor are first entered into the machine, there being a double entry of the divisor, i. e., the divisor is entered into each of two separate entry receiving devices. Immediately following the cycle in which the dividend and the divisor are entered into the machine there is a further machine cycle in which the divisor is subtracted from itself in shifted over columnar relation displaced one place to the right. In other words, one-tenth of the divisor is subtracted from the divisor. The result is that nine-tenths of the divisor becomes set up upon one of the entry receiving devices which originally received the divisor itself. Concurrently with this operation in which the one-tenth of the divisor is subtracted from a divisor entry, the divisor amount is also subtracted from the dividend, subtraction being effected in the highest order or orders places of the dividend. In passing it may be mentioned that the dividend is entered so as to always be introduced as far as possible to the left in the dividend accumulator but leaving two orders to the left of the dividend. This is selectively controlled automatically by the machine itself. The divisor is likewise entered in a similar position in the divisor entry receiving devices. After the first subtraction is completed, further subtracting operations are performed and this subtracting process is repeated until the amount on the dividend accumulator passes through or back of zero. The fact that the diminished dividend has passed through or back of zero is determined by a 9 appearing upon one of the left hand wheels of the dividend entry receiving device, appearing in a particular wheel of the dividend accumulator. This wheel is sensed for the presence of this 9 and when a 9 appears therein it indicates to the machine that a column shift action is to occur and that the nine-tenths divisor amount is to be automatically introduced into the dividend accumulator in the shifted over position therein. This operation is effected once and thereafter there are further automatic subtracting operations performed using the original divisor amount.

All of the foregoing operations will be found to introduce into the dividend accumulator the amount of the quotient. It may be explained that the quotient entries in the dividend accumulator are obtained by virtue of carry-over actions in the accumulator itself.

When the computation has been extended to the predetermined extent and if the dividend accumulator has gone back of zero the machine will not re-introduce the nine-tenths divisor amount into the dividend accumulator and in lieu thereof will add back automatically the original divisor amount. This will then set up in the dividend accumulator in the proper columns thereof the amount of the remainder and it will also serve to bring the quotient to the proper amount.

The machine continues to perform its operations until the desired number of places in the quotient are obtained and thereafter the quotient and the remainder if any, is recorded back on the record card from which the original factor data was derived.

According to the present invention provision is made for recording the quotient and the remainder if any, upon a record card as stated above. Provision is also made for recording this same data upon a record sheet by printing operations.

The calculating machine to which the present improvement is applied, so far as numerous of the various units and the manner of drive is concerned, is substantially the same as the machine shown and described in United States patents to Cunningham, No. 1,933,714 and Oldenboom, No. 1,944,665 to which reference may be had for a fuller description of the general operation of various units and the manner of drive.

In lieu of providing a direct drive for the contact roll 87 (Fig. 1a), a creeping drive is provided of the type shown and described in the United States application of George F. Daly, Serial No. 643,663, filed November 21, 1932. The creeping drive includes supplemental gearing 81a, 81b, 81c and 81d for driving the contact roll 87 with a creeping movement. The machine includes an entry receiving device DD for the dividend (Fig. 1). There is also provided an entry receiving device DR to receive the dividend itself and an entry receiving device .9DR for retaining a set up of nine-tenths of the divisor. These various entry receiving devices are accumulators and are driven in the same manner as correspondingly located units in the Cunningham patent above referred to. There is also a reset drive generally similar to that shown in the Cunningham patent.

In addition to the foregoing entry receiving devices a printing section is provided, indicated at PR (Fig. 1). This printing section is similar to the printing section or unit of a conventional printing tabulator and particularly is like the printing mechanism shown and described in the copending application of George F. Daly, Serial No. 704,768, filed December 30, 1933. In explanation it may be stated that in lieu of providing two cams, a list cam and a total print cam, there is a common drive and the printing mechanism is normally out of operation and selectively called into operation by means of a one-revolution clutch shown at 10 in Fig. 1. This one-revolution clutch is called into operation upon energization of one-revolution clutch magnet 11 (Fig. 1).

The machine also includes a column shift and control relay section CS and CR (Fig. 1a). The machine includes three impulse emitters 12, 13 and 14 (Fig. 1) and two impulse distributors 15 and 16 (see Fig. 1).

In the present machine there are fifteen FC cam contacts which are designated FC—1 to 15 inclusive on Fig. 1a, which are driven from the card feed drive in the indicated manner. The machine includes cam contacts CC—1 to 12 inclusive (Fig. 1) which are driven from accumulator drive shaft in the indicated manner. The DD accumulator resetting devices control three sets of contacts, one group is designated 17 and comprises a pair of contacts which are adapted to be opened upon reset. Another group is designated 18 and comprises a pair of contacts which are adapted to be opened upon reset. The third group of contacts are three-blade contacts designated 19 and 20. Contacts 19 are adapted to be opened upon reset and contacts 20 close upon reset.

Referring now to Fig. 2, the card handling and sensing section of the machine is generally the same as in the Cunningham patent above referred to. The usual readout or sensing brushes are shown and designated at 21. A supplemental set of pre-sensing or advance sensing brushes are also shown which are indicated at 22. This set of brushes comprises a complete set of brushes which extend completely across the record card field. There are also provided the card lever contacts 23. Supplemental card lever contacts 24 are likewise provided which are set to come into action in advance of the other regular card lever contacts 23.

Complete details of the punch are not herein shown as they are substantially the same as in the punch described in the Cunningham and Oldenboom patents. A fragment of the punch is shown on Fig. 1a in proximity to the card R in the entering section of the punch. The rectangle indicates the punching mechanism of the aforesaid patents.

Readouts

The various entry receiving devices have readouts associated therewith. The DR entry receiving device has a readout of so-called inverting type as shown on the circuit diagram (Fig. 3a). With this form of readout it is possible to read out either the true number standing in the entry receiving device or the true complement thereof. The nine-tenths DR entry receiving device is provided with a straight or simple form of readout. The DD dividend accumulator is provided with a double form of straight readout. This double readout is provided so that one section can be utilized to read out to the punch and the other section to read out to the printing mechanism. The DD accumulator also has a supplemental superimposed readout which is used for control purposes. This is driven from the regular double readout by suitable gearing. Full details of such double or superimposed readout is shown in the copending application of James W. Bryce, Serial No. 654,619, filed February 1, 1933.

Quotient place mechanism

In addition to the readout structures the machine is provided with a quotient place mechanism which is generally in the nature of a readout structure. A portion of this quotient place switching mechanism is shown in Fig. 5. As here shown it comprises a series of brush assemblies generally designated 62 fast to, but individually insulated from a shaft 63 and concurrently positioned by a knurled wheel 64 fast to the shaft 63. The knurled wheel may be conveniently provided with a pointer 64a cooperating with an index 64b. Each brush assembly 62 cooperates with a readout commutator shown in Fig. 5 comprising segment spots 62a and with an associated common segment 65. Each readout commutator has eight readout or segment spots 62a corresponding to eight columns, the maximum number of quotient places which may be obtained with the present machine.

In the instant machine there are thirty-three commutator sections, only three of which are shown in Fig. 5, the remainder are shown in the circuit diagram. It will be understood that the brush assemblies are concurrently positioned and they may be set to stand on any one of the segment spots from 1 to 8 inclusive. On the index 64b the numbering is doubled because of the dual brush arrangement. In positioning this quotient place mechanism the knurled wheel 64 is turned up to the number of maximum places desired in the quotient.

Operation

Before describing the circuit diagram of the machine the general mode of operation of the machine will be briefly explained. It will be assumed that the present machine is intended to handle dividend entries of a maximum of eight columns and divisor entries of a maximum of four columns. Obviously the machine may have a greater or less capacity. Upon a card entering the sensing section of the machine the pre-sensing brushes 22 sense the divisor and dividend fields of the card and selectively control the entry of the divisor and the dividend in the following manner.

The divisor is entered as far to the left as possible in both of the divisor entry receiving devices. The dividend is entered as far to the left as possible in a selective manner, but in such a manner as to leave two orders to the left of the entered dividend. In short, the pre-sensing brushes feel for the highest order significant digit column of both the divisor and dividend and control the entry into the respective entry receiving devices accordingly in the manner indicated.

Circuit diagram

Figure 3E:
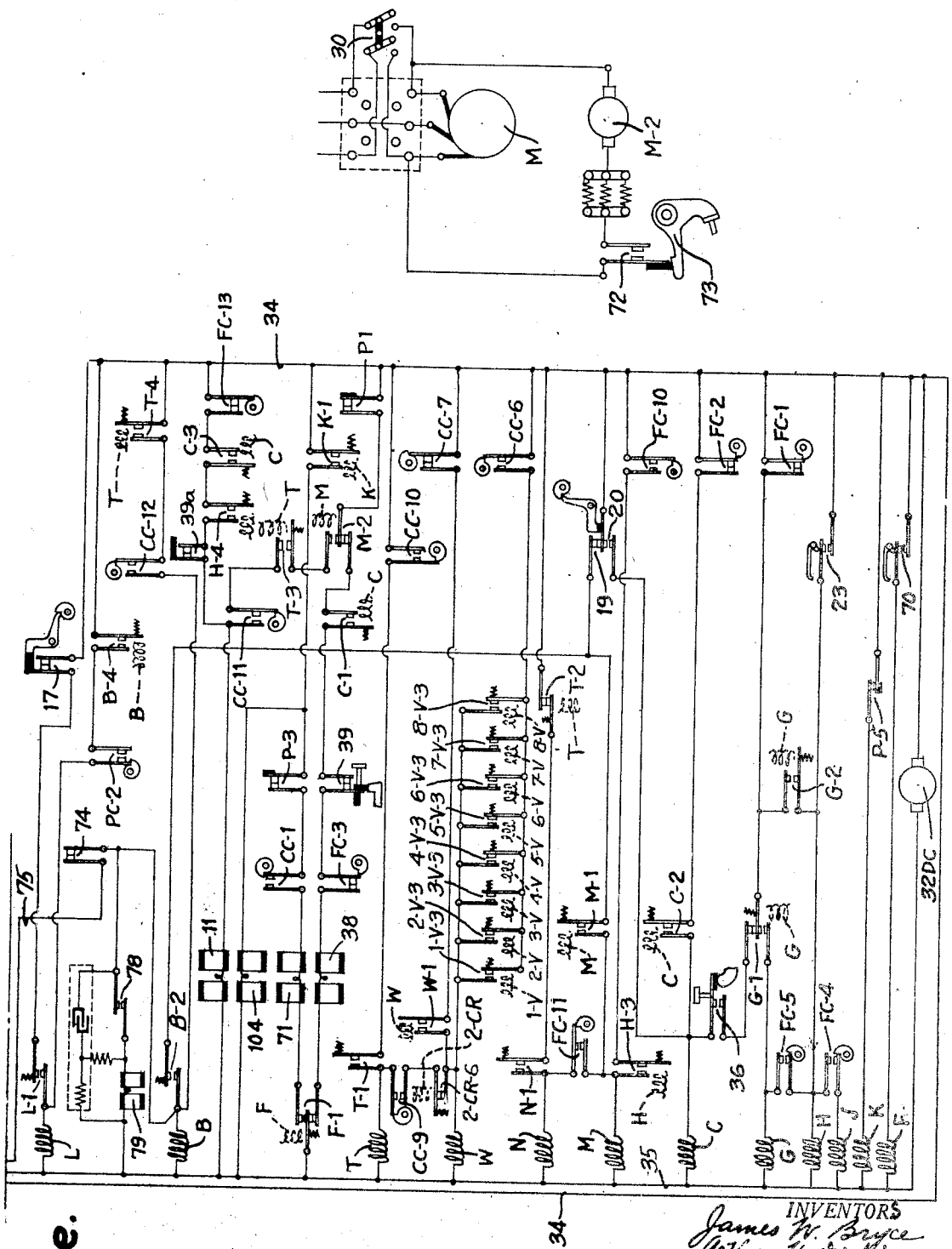

It will be assumed that properly perforated cards perforated with the amount of the divisor and dividend are in the supply magazine 20 of the card handling section of the machine (see Fig. 2). To start the machine in operation the switch 30 (Fig. 3e) is first closed to supply current for the main driving motor M and for the punch driving motor M—2. Rotation of the main driving motor M puts into operation the A. C.-D. C. generator 32 (Figs. 1, 3a, and 3e). The A. C. end of this generator supplies current to bus 33 and to ground and the D. C. end of the generator supplies current to buses 34 and 35. The start key is now depressed to close start key contacts 36 (Fig. 3e) and to complete a circuit from the 35 side of the D. C. line through relay coil C, relay contacts G—1 now closed, cam contacts FC—1, to the 34 side of the D. C. line. A stick circuit is established through relay contacts C—2, cam contacts FC—2 now closed. Energization of relay coil C also closes relay contacts C—1 establishing a circuit from the 35 side of the D. C. line through relay contacts R—1, through card feed clutch magnet 38 (see also Fig. 1a), through cam contacts FC—3 now closed, through stop key contacts 39 now closed, through relay contacts C—1 now closed, through relay contacts M—2 now in the position shown, through the punch controlled contacts P—1 now closed and back to line 34. As in previous machines the start key must be kept depressed for the first four counter-cycles in starting up a run or alternatively it may be depressed and released and again depressed. Starting operations are prevented until the feed rack of the punch is in proper right hand position, this being provided for by contacts P—1.

Before starting up the machine the proper plug connections will be made at plug board 40 (see Fig. 3a) for the entry of the divisor and dividend into their respective entry receiving devices. Other plug connections will be made at plug board 41 to properly plug up the advance or pre-sensing brushes 22 to certain controlling relays. The divisor field relays are designated 42 and the dividend field relays are designated 43. The related contacts are shown at 42a and 43a, there being a single contact pair controlled by each relay coil. When a contact 42a, for example, is closed, it serves to energize a related relay coil 44 and similarly the closure of a contact pair 43a serves to energize a related coil 45. Coils 45 and 44 have associated therewith transfer contacts designated 45a and 44a. The function of these transfer contacts is this—when a transfer contact for example 45a pertaining to a given denominational order is closed, the closure of such transfer contact will serve to energize all of the coils 45 to the right or in relatively lower denominational orders. Transfer contacts 44a similarly control the energization of coils 44 pertaining to relatively lower denominational orders. Coils 45 and 44 likewise control stick contacts 45b and 44b and such stick contacts when closed establish a stick circuit from the 34 side of the D. C. line through any one or more of the coils 45 and 44 and back to the 35 side of the D. C. line through cam contacts FC—7.

It may be explained and as shown on the timing diagram that coils 45 and 44 become energized late in the card feed cycle when a card is passing the advance sensing brushes 22 (Fig. 2).

According to the selective energization of coils 45 and 44 in the manner above explained, there is a selected directed entry of the dividend and divisor into their corresponding entry retaining devices. This is provided for by pyramidical contacts 45c and 44c. Such contacts, according to their selective closure, direct the entry of the dividend into the dividend accumulator so that it always enters therein leaving two clear columns to the extreme left in the dividend accumulator. Similarly, pyramidical contacts 44c according to their selective closure, selectively direct the entry of the divisor into each of its entry receiving devices so it goes into the extreme left hand columns of each entry receiving device. In passing it may be stated that the pickup circuit for the coils 42 and 43 is completed through the following path: referring to Fig. 3a, from line 35, through the card lever contacts 24, through the cam contacts FC—6, through the distributor 16, to the common contact plate 46, thence via the brushes 22, through the plug connections at plug board 41, through the coils 42 and 43 and back to line 34.

At the end of the first card feed cycle, the first card will have been advanced to a point in which it is about to be read by the sensing brushes 21. During the second card feed cycle the card traverses the brushes 21 and the dividend is entered in the dividend accumulator and divisor amounts are entered into their respective entry receiving devices. The divisor it will be understood in this cycle, is entered into both the DR and .9DR entry receiving devices. At the end of the first card feeding cycle the card lever contacts 23 (Fig. 3e) will be closed by the card, causing energization of relay coil H (Fig. 3e) and causing relay contacts H—1 (Fig. 3a) to close. As the second card feed cycle ensues, the card is carried past the brushes 21 and the dividend accumulator DD receives the dividend entry and the divisor entry receiving devices DR, and .9DR receive their entries.

Before tracing the entry circuits, it may be explained that just after the card feed cycle is initiated, cam contacts FC—4 (Fig. 3e) close to energize relay coil J. With relay coil J energized, contacts J—1 to 8 (Fig. 3b) and contacts J—9 (Fig. 3a) will become closed. The entry circuits for the dividend and divisor will now be traced. Current flows from the A. C. line 33 (Fig. 3a) through relay contacts H—1 now closed, through relay contacts J—9 now closed, through impulse distributor 15 to the card transfer and contact roll 87, thence through the brushes 21, pertaining to the divisor, through plug connections at plug board 40, through the pyramidical contacts 44c, to the divisor entry control magnets 47 and 48. The magnets 47 are in the DR entry receiving device and the magnets 48 are in the .9DR entry receiving device. The circuit to the magnets 48 is through the three-blade multi-contacts 1CR—1 to 5 which are in the position shown at the time the first entry is made. The entry circuits to the DD accumulator are through the path previously traced to contact roll 87, through the brushes 21 pertaining to the dividend, through plug connections at plug board 40, through the pyramidical contacts 45c, through relay contacts J—1 to 8 inclusive (Fig. 3b) which are closed by the energization of relay coil J and to entry control magnets 49 pertaining to the dividend accumulator.

It may be explained that prior to the record card passing the regular sensing brushes 21, the printing unit must be called into operation in order that the amount of the dividend and the amount of the divisor can be printed on the strip in the printing device.

The printing unit is called into operation at the proper time in the following manner.

Referring to Fig. 3e, a circuit is completed from the 35 side of the line through the print section clutch magnet 10, auxiliary stop key contacts 39a, through relay contacts H—4, through relay contacts C—3, through cam contacts FC—13, to the 34 side of the D. C. line. The printing section is accordingly in operation at the time the card is traversing the regular reading brushes 21. According to the perforations in the card, the brush circuits are completed through wires in cables 50 and 51 (Figs. 3a to 3d) to sockets at the print section plug board 52, via plug connections at this plug board to the print magnets 53 which are allotted for printing the dividend and divisor. The printing unit obviously operates in the usual way to print the dividend and divisor.

The hand initiating control is cut out after the operations have been properly started. This is effected in the following manner. At the beginning of the second card feed cycle the closure of cam contacts FC—5 (Fig. 3e) will cause relay coil G to become energized. Current flows from line 35, through relay coil G, through cam contacts FC—5, through the card lever contacts 23 now closed and back to the other side of the line 34. The energization of relay coil G will shift relay contacts G—1 to reverse position interrupting the circuit to the start key contacts 36, but maintaining the circuit to cam contacts FC—1. The energization of relay coil G will also close relay contacts G—2 and establish a stick circuit for relay coils G and H either through the FC—1 cam contacts or the card lever contacts 23. It may be explained that the making time of cam contacts FC—1 overlaps the time when the card lever contacts 23 open between cards.

It has been previously explained how the selective closure of pyramidical contacts 45c and 44c (Fig. 3a) selectively direct the entry of the dividend in the dividend accumulator and divisor into its respective entry receiving devices. It will be understood that after the entries have been made into these devices that a further card pertaining to a succeeding computation will follow and pass the advance sensing brushes 22. Before such following card passes the brushes, provision must be made for breaking down the set-up which controls pyramidical contacts 45c and 44c, but before breaking down such set-up a retained set-up must be made corresponding to the previous set up of 45c and 44c for controlling the subsequent reading out operations for recording result data pertaining to the computations related to the card which has been previously sensed. This retained set-up is provided for in the following manner. Relay coils 45 and 44 (Fig. 3a) in addition to controlling the contacts previously referred to, control supplemental contacts 45d and 44d (Fig. 3c). Before cam contacts FC—7 (Fig. 3a) open to de-energize relay coils 45 and 44, cam contacts FC—14 (Fig. 3a) will close to energize relay coil A. The energization of relay coil A effects closure of relay contacts A—1 to 10 (Fig. 3c) and accordingly when cam contacts FC—15 close, circuits are provided through the now closed contacts A—1 to 10 to such of the contacts 45d and 44d which have become closed to thereby selectively energize coils 55 and 54. Such coils 55 and 54 have stick contacts 55a and 54a associated therewith and such stick contacts retain coils 55 and 54 energized after FC—15 and relay contacts A—1 to 10 open. The stick circuit from the 55a and 54a contacts is through a circuit extending through the DD dividend accumulator reset contacts 18 and back to line 34.

It will be understood by the foregoing operation that the set-up which was previously on coils 45 and 44 is now set up on coils 55 and 54 (Fig. 3c). The machine is now in a condition in which the initial stages of division by subtraction can be carried out. Such operations are automatically initiated in the following manner.

Referring to Fig. 3e, since relay contacts H—3 are already closed by the energization of relay coil H in the manner previously explained, at the time cam contacts FC—10 close, a circuit is completed from the 35 side of the D. C. line through relay coil M. The energization of relay coil M closes contacts M—1 to provide a stick circuit for relay coil M. This stick circuit is completed through the DD dividend accumulator reset contacts 19 now closed. At the time a circuit is completed to M to effect its energization cam contacts FC—11 close to complete a circuit to energize relay coil N. Closure of relay coil N causes closure of stick contacts N—1, the stick circuit being completed back to the other side of the line through the normally closed contacts T—2. With the energization of relay coil M, relay contacts M—2 shift to reverse position from that shown. The shift of these contacts M—2 will in a manner to be subsequently explained, complete a circuit to the print clutch magnet 10. The machine is now ready to create a set-up of nine-tenths of the divisor and concurrently while this is being done, a first subtracting operation is to be performed to diminish the dividend by the amount of the divisor. The energization of relay coil H will have closed relay contacts H—2 (Fig. 3b) completing a circuit from the 33 side of the A. C. line, through cam contacts FC—8 through relay coil I—CR. Energization of I—CR will effect shift of relay contacts ICR—1 to 5 (Fig. 3a) to reverse position from that shown. With relay contacts ICR—1 to 5 shifted and with relay contacts W—2 closed in the position shown, current will be supplied to the emitter 12 and with emitter 12 in operation, impulses will be emitted to the inverting readout associated with the DR entry receiving device designated DRIV on the wiring diagram, out via the group of lines generally designated 58, via lines 59, through the now shifted ICR—1 to 5 contacts to the 48 control magnets pertaining to the .9DR entry receiving device.

It will be understood that with contacts ICR—1 to 5 shifted the entry will be made in this entry receiving device in orders each of which is relatively one order lower than heretofore, and that the complement of the divisor amount will be added into this entry device in such columnar orders. There will thereupon appear in such entry receiving device a set up of nine-tenths of the divisor amount. As explained before during this set up of nine-tenths of the divisor there is a concurrent subtracting operation to diminish the amount in the dividend accumulator by the amount of the divisor.

Cycle controller and column shift control

The cycle controller and column shift control of the present machine has the following functions. It correlates the dividend diminishing operations for each quotient place causing the machine to continue to subtract by complemental addition until the dividend accumulator goes back of zero. The cycle controller is then apprised of this fact by the sensing of a 9 in a particular column of the dividend accumulator. It then controls the modification of machine operations to cause the introduction of a correcting factor of nine-tenths of the divisor into the dividend accumulator. While the nine-tenths divisor value entry in the dividend accumulator is effected following column shift the wiring from the nine-tenths readout device to the dividend accumulator is such that the nine-tenths divisor value is added in the same order as the complement was entered to cause an overdraft. The sensing control for the back of zero 9 is then automatically shifted over one column to the right and this shifting is effected under the control of the cycle controller. If no back of zero 9 is immediately obtained upon the entry of the correcting amount into the dividend accumulator, the dividend diminishing operations continue under the control of the cycle controller in the same columnar relation as that used for the correcting entry. These operations continue until another back of zero 9 is sensed. If upon entry of the correcting factor a back of zero 9 condition is immediately produced the cycle controller so controls the machine that the correcting factor is again introduced in shifted over columnar position and the back of zero control is again shifted. The machine operations continue until the cycle controller cooperating with the quotient place limiting device apprises the machine that no further quotient places are to be obtained. Thereupon the cycle controller functions to cause the automatic adding back of the divisor amount itself in the same columnar relation with respect to the accumulator as was used for the last diminishing operation. Accordingly the cycle controller controls the columnar relation of entries into the dividend accumulator. It controls the position of sensing the back of zero 9, shifting the position of the 9 progressively to the right as quotient places are obtained. It controls the introduction selectively of either the complement of the divisor, nine-tenths of the divisor or the divisor itself into the dividend accumulator.

Before explaining how the concurrent subtracting operation is effected, it may be mentioned that there is a cycle and column shift control associated with the supplementary readout of the dividend accumulator for the purpose of controlling the columns in which entries for diminishing the dividend are to be introduced into the dividend accumulator and for controlling the number of cycles for such diminishing operations. This cycle and column shift controller is controlled from the supplementary readout section of the dividend accumulator designated DDRO—2 on the circuit diagram (Fig. 3b). The column shift and cycle controller is biased so that upon the first operation the entry of the complement of the amount of the divisor will be introduced into the dividend accumulator in the most extreme left hand positions thereof in which entries are standing. This is provided for by transfer contacts I—Y—1 which in starting condition are in the position shown. With these contacts in the position shown, upon closure of cam contacts CC—5 (Fig. 3b) and upon closure of relay contacts N—3 which is brought about by the energization of relay coil N in the manner previously explained, current supply is afforded for column shift relay coil CSa. The energization of column shift relay coil CSa closes the related column shift contacts CSa' and accordingly the complemental impulses related to the amount of the divisor will flow through the DRIV readout through the lines generally designated 58, through the 2CR—1 to 5 contacts now in the position shown, through the group of lines generally designated 60, through the column shift relay contacts CSa' and over to the entry control magnets 48 pertaining to the DD accumulator. Accordingly the complement of the amount of the divisor will be introduced into the DD accumulator.

Concurrently with the introduction of the first complement of the divisor into the dividend accumulator, a 9 is entered in the column of the dividend accumulator next to the left of the one receiving the entry, i. e., the furthest left hand order of this accumulator. This is provided for by a circuit traced as follows. Through relay contacts H—2 (Fig. 3b), cam contacts FC—9, to the last entry control magnet of the group to the left and back to ground.

Upon completion of this first operation in which the .9 divisor is created and the complement of the divisor is introduced into the dividend accumulator DD, relay contacts ICR—1 to 5 will shift back to the position shown in the circuit diagram, thereby interrupting the circuit to the .9DR entry control magnets 48 and preventing further change of the set-up of the related entry receiving device. The emitter 12, however, will continue in operation and continue to emit impulses over the circuits just traced, via 58, 60, etc., to the entry control magnets 49. The amount standing in the DD accumulator will be accordingly diminished by progressive subtracting operations which are performed by complemental addition until the order wheel pertaining to the highest order dividend column receiving an entry from the DRIV readout stands at 9. With this wheel standing at 9, a circuit will be completed through relay contacts N—2 (Fig. 3b), cam contacts CC—2, through the 1—Y—2 transfer contacts, through a 1V relay coil, through the brush of the DDRO—2 readout which is now standing at 9 and out via return line 61, to D. C. line 34. The coil 1V being thus energized, it is held energized for a short time by stick contacts 1V—1, the return circuit being via cam contacts CC—3. The energization of coil 1V effects closure of pick-up contacts 1V—2 and a circuit will be completed from the 35 side of the line through relay contacts N—2, cam contacts CC—4, through relay contacts R—2 now closed, through relay contacts 1V—2 now closed to energize relay coil 1Y. The energization of relay coil 1Y will shift transfer contacts 1Y—1 and 1Y—2 to reverse position from that shown. After relay coil 1Y has become energized, relay coil 1V is de-energized.

The foregoing operations take place when the dividend accumulator goes back to zero. With the dividend accumulator back of zero it will be understood from the preceding general description that the operation is to interrupt the introduction of complements of the dividend into the dividend accumulator and to introduce therein nine-tenths of the divisor in a shifted over columnar relation therein. The energization of 1V will have also closed relay contacts 1V—3 (Fig. 3e) and accordingly with contacts 1V—3 closed when cam contacts CC—6 close, relay coil W will be energized. A stick circuit will be provided for relay coil W though stick contacts W—1 and cam contacts CC—7. With relay coil W energized (see Fig. 3e) relay contacts W—2 (Fig. 3a) and W—3 (Fig. 3a) will be shifted to reverse position from that shown. The energization of relay coil W will also close relay contacts W—4 (Fig. 3b).

Upon the next cycle, upon closure of CC—5 several operations take place concurrently. The column shift relay coil CSb is energized, relay contacts 1Y—1 being already shifted to reverse position from that shown in the diagram and relay contacts 2Y—1 being in the position shown. With CSb energized, the corresponding column shift contacts CSb' will be closed. With relay coil W energized, contacts W—4 will be closed and at the proper time in the cycle relay coil 2—CR will be energized to cause the shift of relay contacts 2—CR—1 to 5 (Fig. 3a) to reverse position from that shown. With such contacts 2—CR—1 to 5 in shifted position and with the emitter 13 in operation and receiving current through contacts W—2 now in shifted position, impulses will be emitted through emitter 13, via cable 62, through the .9DRRO readout and nine-tenths of the amount of the divisor will be read out from the .9DR entry receiving device and flow through the 2—CR—1 to 5 contacts now in shifted position via the line 60 (Fig. 3b), through the column shift relay contacts CSb' and over to the entry control magnets 49 in a shifted over columnar relation therein provided for by the CSb' contacts. This will introduce nine-tenths of the amount of the divisor into the dividend accumulator. The effect of this is the same as adding in the amount of the divisor and again subtracting it in shifted over columnar relation in the dividend accumulator. After this operation is completed there is again a sensing of the dividend accumulator to determine whether or not the accumulator has again gone back of zero and if the accumulator has not gone back of zero a zero will appear to the left of the previously diminished dividend amount. Under these conditions the machine will then proceed to reintroduce the complement of the divisor into the dividend accumulator. This operation will occur by reason of the fact that relay coil W (Fig. 3e) becomes de-energized upon the opening of the stick circuit by cam contacts CC—7 and with relay coil W de-energized contacts W—2 and W—3 (Fig. 3a) shift back to the position shown in the diagram. Relay coil 2—CR likewise receives no current impulse at the time cam contacts CC—5 close and accordingly contacts 2—CR—1 to 5 assume the position shown in the diagram which is the reverse of the position which they previously assumed. Accordingly, there is a readout from the divisor entry receiving device through the inverting top readout section and the complement of the divisor is introduced into the dividend accumulator in proper columnar relation therein. This operation continues until a 9 appears in the dividend accumulator to the left of the diminished dividend. When such 9 appears, relay coil 2V becomes energized. There is a closure of stick contacts 2V—1 and contacts 2V—2 close. Relay coil 2Y becomes energized, stick contacts 2Y—3 close, transfer contacts 2Y—2 shift and transfer contacts 2Y—1 shift to transfer the column shift control to the CSc coil, etc.

It will be unnecessary to trace the further operations.

*Introduction of quotient into the dividend counter*

The manner in which the quotient amount becomes set up in the dividend accumulator can best be understood by referring to the typical computation Fig. 6. In this figure it will be noticed that on the second subtracting operation in which the complementary amount 9880 is added to 045635 that there is a carry-over by the usual carry-over devices in the dividend accumulator to the extreme left hand column of 1. This figure 1 represents the quotient up to this point. Upon the next subtraction there is a further carry-over giving 2 in the extreme left hand column of the dividend accumulator and so on. Attention is directed, however, to the fifth entry. On this fifth entry the dividend accumulator goes through or back or zero. There is accordingly a 9 in the column of the dividend accumulator immediately to the right of the 3 which is at the extreme left. This 9 is indicated in the typical computation with a prime, i. e., 9'. It is this 9 which is sensed to determine that the accumulator has gone back of zero. It will also be noted that on this entry there is no carry-over to the left, the 3 remaining as a 3. However, on the following entry where 108, i. e., nine-tenths of the divisor is added into the dividend accumulator in shifted relation it will be noted that there is a carry-over. Accordingly, this carry-over increases the previous 3 to 4 which is the amount of the quotient in the first place. Upon the next subtracting operation the carry-over in the dividend accumulator goes into the column to the right of the column in which the 4 stands showing as a 1. If the typical computation is followed down it will be noted that this column progressively increases 1, 2, 3, 4, 5, 6, 7 and that on the following computation where 9880 is introduced to bring the accumulator back of zero that a 9' will again appear to the right of the 7. The 9' amount is then sensing control and this causes the introduction of nine-tenths of the divisor into the dividend accumulator in shifted over columnar relation therein. After the amount of 108 is introduced another 9' appears. There is accordingly a further introduction of 108 which causes the carry-over to change the 7 to 8 which is the amount of the quotient in this particular column.

From the foregoing it will be seen that the quotient amount is introduced into the dividend accumulator by the carry-over divisor of the accumulator itself in the columns to the left of the dividend amount and by referring to the last three typical computations it will be seen that the quotient ultimately becomes introduced into columns of the dividend accumulator upon which the dividend amount previously stood.

*Mechanism for controlling number of quotient places*

According to the present invention provision is made for pre-setting the machine so that for any given computation within the limits of the capacity of the machine the quotient can be carried out to a pre-set and pre-determined number of places. To illustrate, consider the following computations, assume 8416 to be divided by 4. If this division is carried out 4 will divide into 8 and go twice. It will go into 4 in the next column once, it will not go into 1 and it will go into 16, four times. The answer will be 2104, a four place quotient. However, assume that the computation is to be 8416 divided by 9 and that a four place quotient is to be obtained. Under these conditions the 9 if divided into 8 will not go and accordingly the quotient must be shifted over out of the first position. If the 9 is again divided into 85, it will go 9 times. The remainder is 31 and 9 will go three times. The next remainder is 46 and 9 will go five times. The following operation relates to a remainder since the dividend has been completely divided and the machine will stop and the answer will be 935 with a remainder of 1. The mechanism to be described, takes care of both of these conditions, that is, it allows the quotient to be computed to the determined number of places or one less depending upon whether the divisor goes in the first place or not.

The place limiting mechanism comprises switching mechanism (see Fig. 5). The switching mechanism comprises a series of brush asssemblies generally designated 62, fast to a shaft 63 and positioned by a single knurled wheel 64 fast to the shaft. The brush assemblies cooperate with a number of readout commutators, the readout sections having eight readout or segment spots 62a corresponding to the maximum number of quotient places which may be obtained in this machine. In the instant machine there are thirty-three read-out sections, thirty-two being shown on Fig. 3c of the circuit diagram and an extra one being shown on Fig. 3b of the diagram.

Before a computation is started the knurled knob 64 is turned up to bring a numeral corresponding to the maximum places to which the quotient is to be computed into alignment with an index.

This quotient place mechanism will first be described with the typical computation of Fig. 6, and it will be assumed that the mechanism is set for a four place quotient. To set the mechanism for a four place quotient, knurled knob 64 will be at the 4 position.

Referring now to the typical computation (Fig. 6) attention is directed to the third line from the bottom. Here the following numbers appear:

4 8 0 1 9' 9 9 0 0 0

The underlined numerals are the quotient figures obtained by the preceding steps of the computation. The 9' in the position to the right of the 1 signifies that the machine has gone back of zero. It will be noted further than four quotient places have been obtained and that the machine has gone back of zero. Upon the next computation instead of introducing nine-tenths of the divisor into the dividend accumulator in shifted over columnar position therein the mode of operation must be changed to introduce the divisor itself into the dividend accumulator in non-shifted over columnar relation therein. Notice the introduction of 1200 in line 2 of the computation from the bottom. The purpose of this is to obtain the final value of the quotient, i. e., 4 8 0 2 and the true value of the remainder or 11.

When the machine senses the 9' above referred to in line 3 from the bottom of the computation of Fig. 6, relay coil 4V (Fig. 3b) becomes energized and is maintained energized by the stick contacts 4V—1. Each of the V relays has further supplementary relay contacts designated 4V—4 for relay coil 4V which are associated with the quotient place determining mechanism. The purpose of these contacts is to prevent a related Y relay coil from becoming energized upon the energization of a V coil which is the normal procedure. By preventing 4Y, for example, from becoming energized the column shift will be suppressed. The circuit will now be traced. Upon energization of 4V, contacts 4V—4 become closed and a circuit is established from line 35 via wire 67, through cam contacts CC—8, through relay contacts 4V—4, through brush 62 at position 4, to common strip 65, through relay coil R and back through a line 68 to the other side of the D. C. line 34. The energization of R establishes a stick circuit to maintain relay R energized through stick contacts R—1 and return line 69 back through relay contacts N—2 to line 35. With relay coil R energized relay contacts R—2 are open prior to the time that contacts CC—4 close. Accordingly relay coil 4Y will not become energized.

The energization of R will also open relay contacts R—3 and prevent the energization of relay coil 2CR at the time cam contacts CC—5 close. Accordingly, relay contacts 2CR—1 to 5 will remain in non-shifted position and there will be a readout of the dividend amount itself from the DRIV readout by means of emitter 13. This readout of the dividend is from the DRIV readout and is controlled in the following manner. At the time relay coil 4V becomes energized (Fig. 3b) relay contacts 4V—3 (Fig. 3e) allow energization of relay coil W upon closure of cam contacts CC—6. With relay coil W energized there is a shift of relay contacts W—2 and W—3 to reverse position from that shown. Relay contacts W—2 in shifted position provide current supply for emitter 13 from A. C. line 33 and with this emitter in operation the amount of the divisor is read out from the DRIV readout and the impulses flow over lines 58, the non-shifted 2CR—1 to 5 contacts, the lines 60, through the CSd' column shift contacts and into the entry control magnets 49. The result of this action is that the amount of the divisor, i. e., 1200 in the illustrated computation is added into the dividend accumulator. When the machine operates to read out the true amount of the divisor itself, instead of the nine-tenths divisor amount the quotient computing operation of the machine is terminated. That is, if contacts 2CR—1 to 5 are in non-shifted position and with relay coil W energized, the operations are terminated. The control for the termination of such operations is as follows: With relay contacts 2CR—6 (Fig. 3e) in the position shown, which is the position which they assume with contacts 2—CR—1 to 5 in non-shifted position, a circuit is completed through cam contacts CC—9, to energize the relay coil T. A stick circuit is established through relay contacts T—1 and cam contacts CC—10. With relay coil T energized, relay contacts T—2 open to break the stick circuit for relay coil N. Accordingly, relay contacts N—2 and N—3 open up (Fig. 3b). The opening of relay contacts N—2 interrupt the circuit to all of the V coils and break the circuit through the 9 sensing spots of the DDRO—2 readout. They likewise break the holding circuits for the Y relay coils and break the circuit for the R relay coil. The opening of contacts N—3 break the circuit to the transfer contacts Y—1, etc. and interrupt the circuits to the CS column shift relay coils.

By the foregoing controls, division operations are terminated and the machine is then ready to record the quotient and remainder.

Before describing the manner in which recording operations are brought about the operation of the machine will be explained with respect to a problem in which the divisor fails to divide into the dividend in the first place. A typical computation in which this action occurs would be in dividing 5763 by 7953. With such a problem the nine-tenths of the divisor is 71577. In performing this computation the entries would be as follows: The first line in the following example shows the setup on the dividend accumulator, the second line shows the introduction of the complement of the divisor thereinto, the third line shows the result of this addition and the fourth line shows the introduction of the nine-tenths divisor into the dividend accumulator.

```
1..................................... 005763
2..................................... 992047
                                        ------
3..................................... 997810
4..................................... 71577
                                        ------
                                        0049677
                                        92047
                                        ------
                                      * 0141724
```

From line 3 of the foregoing it will be noted that the divisor did not go in the first place, 0' signifying that the divisor fails to go. Upon the presence of this 9 in this position, the machine senses it. Accordingly, relay coil IV would become immediately energized. Such relay coil IV is provided with supplemental relay contacts IV—5. With relay contacts IV—5 closed, upon closure of cam contacts FC—12, a circuit is established to energize a relay coil S. With S energized, stick contacts S—1 are closed to maintain S energized. The return circuit from the stick contacts S—1 is through a line 69 and relay contacts N—2. With relay coil S energized, relay contacts S—2 are shifted to reverse position from that shown.

With relay coil IV energized, relay contacts IV—2 will become closed, energizing the IY relay coil. Relay contacts IV—3 (Fig. 3e) will become closed energizing relay coil W, causing shift of relay contacts W—2 and W—3 allowing the emitter 13 to emit through the nine-tenths DRRO readout so that impulses flow over the line 60, through the CSb' column shift contacts and to the entry control magnets 49 pertaining to the accumulator DD. The result of this is to enter 71577 in the accumulator DD in shifted over columnar relation therein.

It will now be assumed that the quotient place setting mechanism is set to compute to one place. Under this condition the brush 62 will be on the spot 62a appropriated to the "1" position of wheel 64 and in contact with common strip 65. It has been previously explained that contacts S—2 are in shifted position. With relay coil IV energized, relay contacts IV—4 will be closed, but with contacts S—2 in shifted position the circuit to relay coil R will not be completed upon closure of cam contacts CC—8. Accordingly, the machine continues successive subtracting operations until the dividend accumulator goes back of zero. Thereupon operations are terminated as before described.

When the divisor does not go into the first place of the dividend, the carry-over increment which is used to build up the quotient no longer goes to the highest order column of the dividend accumulator but in contradistinction goes to the next lower order column as will be clear from the fragment of the computation quoted above.

It will be understood that the number of quotient places may be selectively controlled by placing the brush 62 on a commutator spot 62a according to the number of places of the quotient to be computed.

It will be further understood that if the divisor does not go in the first place in the dividend that the quotient will be computed to one less number of places, that is, if the machine is set for a four place quotient and the divisor does not go the first time, the quotient will be computed to three places and not to four because the complete whole number quotient is obtained before the computation has been carried out to four places.

It may be further explained that if the machine is set for a one place quotient, it will compute for a one place quotient irrespective of whether or not the divisor goes the first time into the dividend.

*Recording of quotient and remainder*

Before describing the recording operation it may be explained that after the card has been sensed and passes the brushes 21, it is fed through the card handling section of the machine and ultimately such card passes to the R position in the punch, closing card lever contacts 70 (Figs. 3e and 2) energizing relay coil F and shifting relay contacts F—1 to reverse position from that shown. In starting up the machine the usual punch racks (shown in the Cunningham and Oldenboom patents) are in extreme outer position and accordingly contacts P—1, P—3 and P—5 are closed. With contacts P—5 closed, relay coil K will be energized, and relay contacts K—1 will be in closed position. Upon the shifting of relay contacts F—1 and upon the closure of cam contacts CC—1, a circuit will be established to the punch clutch magnet 71. This circuit is completed to the other side of the line, through the punch contacts P—3 now closed and relay contacts K—1 also closed. The energization of the punch clutch magnet 71 will cause closure of contacts 72 which become latched closed by latch 73. Accordingly current supply is provided for the punch driving motor M—2. The card which has been previously read and which is in the punching unit in the R position is now advanced endwise through the punch unit to a position in which punching is to commence.

The energization of relay coil T in the manner previously explained will have closed relay contacts T—4 and upon closure of cam contacts CC—12 relay coil B becomes energized closing stick contacts B—2, the holding circuit extending through the DD reset contacts 19 now closed. With relay coil B energized, current also flows through the punch escapement contacts 74, via a line 75 (Fig. 3d) to the readout strip 76. With current thus supplied to the readout strip and with the brush of the readout standing on the first of the commutator spots at which punching is to commence the punching operation will start, there being a readout through one section of the DDRO readout and an energization of the punch selector magnets 77 (Fig. 3c). The energization of relay coil B will also supply current to contacts 78 in the punch, which contacts are closed by interposer action, to supply current to the punching magnet 79. Punching now proceeds and will continue until the complete quotient and remainder is read out and punched.

It may be explained that in punching the quotient and remainder on the card provision must be made for controlling the placing of the quotient and remainder amounts on the card so that they will be placed thereon in proper columnar relation and so that the quotient part of the result is properly denominated.

According to the principle of operation of the machine, the quotient will have a terminating place or column position in the dividend accumulator depending upon the number of places for which the machine is set to compute the quotient, that is, the terminating point of the quotient will vary according to the number of positions for which the machine is set to compute. Obviously the remainder will have a corresponding shift of positions in the dividend accumulator.

In recording results on the card the number of places to which the quotient is to be computed will affect the location of quotient recording and accordingly provision must be made to selectively locate the position of quotient recording in accordance with the number of places to which the quotient is to be computed. The place setting mechanism switching means are used for this purpose, such place setting mechanism switching means also control the position in which the remainder is recorded on the card.

It will be further recalled that in entering the dividend and divisor into the machine that there was a shift of the entry so that the highest order digit of both the divisor and dividend went to a determined position in the dividend accumulator and divisor entry receiving devices. In recording result data the entering shift of the dividend and divisor must be taken into account. The rule as to shift back for these conditions is as follows.

The number of places in which the quotient is shifted back to the right upon recording is equal to the number of places to which the dividend is shifted to the left less the number of places the divisor is shifted to the left upon entry plus 3.

It may be further explained that upon the entry of the divisor and dividend into the machine into their entry devices they lose their relative denominational value. However, the extent of shift upon entry is retained in the machine and the shift back according to the above rule re-assigns denominational values to the quotient results and evaluates the quotient in terms of the relative denominational values of the originally entered divisor and dividend.

Referring again to the circuit diagram the reference numeral generally designated 90 (Fig. 3c) is the place limiting switch mechanism for controlling readout of the quotient to the punching mechanism. The switching mechanism generally designated 91 is the place setting mechanism for controlling the positioning of punching of the remainder according to the number of places to which the machine is set to compute the quotient. The switching mechanism generally designated 92 is for controlling the printing of the quotient and the mechanism generally designated 93 controls the printing of the remainder. By setting the place setting switching mechanism on the eight segment spot position the left hand eight columns leading out from the DDRO readout will be connected for recording the quotient and two columns will be left only for recording the remainder. By setting the mechanism on the 7 spot there will be one less column for the quotient and an additional column for the remainder. The same applies to the setting of the other switching mechanisms, viz., 92, 93. It will be recalled from what has been previously described that the highest orders of the dividend receiving accumulator are provided to receive two quotient digits. For example, if the machine is set for one quotient digit and the divisor is entered in the dividend receiving accumulator in the first division operation the quotient result would be represented as "20" for example, the "2" being entered in the highest order. In the event that the divisor should fail to go and the result is for one quotient digit the machine will continue the division operation, as has been explained, and the quotient result would be —02— for example. For this reason, it is necessary to have these two orders always available to control the recording of two quotient digits. Hence, the wiring between the two left hand orders of the DDRO—1 and the two left hand orders of the switching mechanism 90 are identical and take care of the recording of the two quotient digits, irrespective of whether the setting is for one digit or two quotient digits. Coming out from the switching mechanism 90 are a set of lines 94 and coming out from the switching mechanism 1 are a set of lines 95. The lines 95 which are the remainder lines lead directly to sockets at a plug board 96. The usual plug connections are made at this plug board to provide for punching of the remainder in the proper field of the card. Referring now to lines 94, these lines extend down to a set of pyramidical contacts 55b (Fig. 3d) which are controlled by relay coils 55 (Fig. 3c). Coils 55 it will be recalled were selectively energized according to the shift of the dividend on entry. Pyramidical contacts 55b are wired to another set of pyramidical contacts 54b, which contacts 54b are in turn under control of relay coils 54. 54, it will be recalled were energized according to the shift of the divisor upon entry. The wiring of pyramidical contacts 55b and 54b with respect to each other and with respect to the incoming lines 94 and outgoing lines 97, which extend to the plug board 96, is such that the foregoing shift back law is complied with, that is, the quotient is shifted back to the right, an amount equal to the shift to the left of the dividend upon entry less the number of places the divisor is shifted to the left upon entry plus 3.

It will be understood that suitable plug connections are made at the sockets to which the lines 97 extend to provide for punching up the quotient in the proper field on the record card.

In connection with the foregoing quotient shift back control, provision must be made for providing for the punching of zeros to the left and right of the quotient. This is provided for by a dual control. Certain zeros are recorded under control of a zero circuit 98 which feeds into the 90 switching mechanism and into the 91 switching mecahnism in the manner shown to control punching of zeros to the right of the quotient and to the left of the remainder. On account of the shift back, supplemental zero controls must be provided which is provided for by a circuit 99 extending to certain of the 55b and 54b contacts. This circuit provides for the punching of additional zeros beyond those provided for by the previously described zero control.

For recording the quotient and remainder on the printing mechanism the switching mechanisms 92 and 93 have outgoing lines leading through cables 100 and 101. The wires in cable 100 lead to similar pyramidical contacts 55c which are in turn wired to contacts 54c (Fig. 3d), these contacts being controlled in a similar manner to contacts 55b and 54b previously described, that is they are under the control of relay coils 54 and 55. A plug board is provided at 102 which is the printing plug board. The wires and cables 101 lead to plug sockets at this plug board and the outgoing lines from contacts 54c likewise lead to sockets at this plug board. By proper plug connections across this plug board the circuits can be extended to energize selected ones of the printing magnets 53 in the printing mechanism.

In passing it may be mentioned that no zero control is required in the printing mechanism circuits because zeros are taken care of automatically in the printing mechanism itself.

The manner in which the printing mechanism is called into operation to print quotient and remainder data will now be described.

When the machine is in condition for printing quotient and remainder data, contacts M—2 (Fig. 3e) will be in shifted position, this being brought about by the energization of relay coil M in a manner previously described. Contacts T—3 will also be in closed position, being brought to this position in a manner previously described. Accordingly, when cam contacts CC—11 close, current will flow from line 35, through the print clutch magnet 11, through CC—11, through contacts T—3, through contacts M—2 in shifted position, through the punch control contacts P—1 now closed and back to line 34. With printing clutch magnet energized the printing section is brought into operation in the usual manner. Upon operation of the printer drive shaft, cam contacts PC—1 and PC—2 (Figs. 3c and 3e) close to supply current from the 33 A. C. line, through the PC—1 contacts, through contacts B—3 now closed to emitter 14. The emitter 14 in rotation emits its impulses through one section of the DDRO—1 readout and such impulses flow down through the cable 103, through the place setting switching mechanisms 92, 93, through the cables 100 and 101, through the plug connections at plug board 102 (Fig. 3d) to the printing magnets 53 which are allotted for controlling the printing of the quotient and remainder.

During printing of the result, cam contacts PC—2 (Fig. 3e) close energizing relay coil L, relay contacts B—4 being closed at this time. A stick circuit is provided for L through contacts L—1 and the reset contacts 17 of the dividend accumulator DD.

While printing takes a definite cycle, punching, since the punch is of the repetition punching type, may take an indefinite time. Punching will continue until all columns are punched and ultimately the card in the punch passes to beyond the last column position, closing contacts P—5 (Fig. 3e) and energizing relay coil K. The energization of K will close contacts K—1 to complete a circuit to the ejector magnet 104 in the punch and cause the card to be ejected.

The machine is now ready to reset the dividend accumulator, and the two divisor entry receiving devices and such reset is initiated in the following manner. The energization of relay coil K has also closed relay contacts K—2 (Fig. 3b) and a circuit is completed from A. C. line 33, through cam contacts CC—5, to relay contacts K—2, through relay contacts L—2 now closed, relay contacts B—1 now closed to the 105 reset magnet which pertains to the dividend accumulator DD. Current is also supplied to reset magnets 106 and 107 which pertain respectively to the DR entry receiving device and to the nine-tenths DR entry receiving device.

The foregoing controls insure completion of both punching and printing before reset and also insure that a new calculation will not be initiated before the completion of punching and printing the results of the last computation.

With the foregoing reset magnets energized, reset is effected in the usual way.

With the accumulator DD and the divisor entry receiving devices reset the machine is now ready to reinitiate a card feed in the card handling section of the machine so that a new computation can be carried out. This is brought about in the following manner.

During the reset of the DD accumulator, contacts 18 (Fig. 3c) open to break the stick circuit for the 55 and 54 relay coils allowing these coils to become de-energized. The reset contacts 17 (Fig. 3e) related with the DD reset mechanism open to de-energize relay coil L causing opening of relay contacts L—1.

Referring to Fig. 3e, the contacts 19 open up to break the stick circuit for relay coil M and to break the stick circuit for relay coil B. The closure of reset contacts 20 completes a circuit to energize relay coil C. With relay coil M de-energized in the manner just described and with relay coil C energized, contacts M—2 shift back to the position shown in the diagram and a circuit is established from line 34, through the P—1 contacts, through M—2, through C—1, closed upon the energization of relay coil C, through the stop key contacts 39, through the FC—3 cam contacts, through the card feed clutch magnet 38 and back through the F—1 contacts to the 35 side of the line. The energization of the card feed clutch magnet 38 reinitiates a new card feed and a new computation then proceeds on a following card.

According to the present machine if the quotient place setting mechanism is set for a four place quotient and the quotient comes out even in 2, the machine will continue in operation and will put back nine-tenths of the divisor into the dividend accumulator until the determined number of places in the quotient have been reached. At this point the operation will be modified and the divisor amount itself will be placed back into the dividend accumulator, bringing the dividend accumulator into condition in which it has no remainder and in which the amount of the quotient stands upon it in the proper columns.

With regard to the printing mechanism used for recording the dividend, the divisor and quotient, for simplicity of construction, this printing section is arranged so that the divisor and dividend are printed on one line and the quotient is printed upon the next following line. Obviously, such a construction is not essential because suitable means could be provided for suppressing paper feed.

On the diagrammatic views, Figs. 6, 7 and 8, next to the bottom of the card, there is shown a fragment of the paper strip indicating the manner in which the divisor, dividend and quotient is printed with the quotient on the following line with respect to the divisor and dividend imprints.

It will be understood that with the present machine records can be handled with the divisor and dividend perforated in the customary way, that is with the decimal point at a pre-determined point on each card which is maintained for all cards of a series. The beginning point of the divisor and dividend will of course vary with variable sized factors. Upon reading of the records each record is pre-sensed to determine to what extent, if at all, the dividend and divisor entries are to be shifted upon entry. The back shift upon result recording gives a denominational value for the recorded quotient results which is retained for all of the successive records and which for each record is based upon the relative size of the dividend and divisor. Accordingly, the machine has the capability of automatically dividing and recording a plurality of results without manual intervention and without any special perforating of the records.

The shifting over of the divisor and dividend upon entry not only provides a control whereby a set up may be obtained for denominating each calculated result, but it also provides means whereby the available capacity of the entry devices of the machine may be effectively utilized for carrying out computations to the greatest possible number of places for a given problem. All of these results are obtainable without specially perforating the controlling card records. Such records are perforated according to standard tabulating practice with the denominational place relation maintained for a series of records.

What we claim is:

1. In a record controlled dividing machine, quotient digit entry receiving elements representing the results of the division of a dividend and divisor value represented on a record, said quotient digit entry receiving elements receiving undenominated quotient amounts having a possible denominational variation in accordance with the denominational magnitudes of the divisor and dividend values involved in the computation means for sensing a record for detecting the denominational magnitude of the dividend and divisor values involved in the calculation, quotient digit recording means including zero digit recording means, selecting means for selectively causing one or more of said digit entry receiving elements to control said quotient recording means to control the number of quotient digits recorded thereby, supplemental selecting means controlled by the aforesaid sensing and detecting means or predetermining the denominational position for recording the quotient digits, means controlled by the first named selecting means for causing the zero digit recording means to record one or more digits at the right of the quotient digit recording, and means controlled by the aforesaid sensing and detecting means for causing the zero digit recording means to record one or more digits at the left of the quotient recording.

2. In a record controlled dividing machine, digit receiving elements, some representing quotient digits and the others a remainder resulting from a division computation of a divisor and dividend value, said quotient digit receiving elements receiving undenominated quotient amounts having a possible denominational variation in accordance with the denominational magnitudes of the divisor and dividend values involved in the computation means for sensing the record for detecting the denominational values of the divisor and dividend values involved in the computation, separate quotient and remainder recording means controlled by the aforesaid digit receiving elements, selecting mechanism cooperating with said digit entry receiving elements and said recording means constructed to vary the number of digit receiving elements which are to control said separate recording means and so arranged as to increase or diminish the number of digit receiving elements utilized to control quotient recording as the number of digit receiving elements utilized to control remainder recording are concurrently diminished and increased, respectively, and supplemental selecting means controlled by the aforesaid sensing and detecting means for denominationally varying the denominational position of the quotient digits recorded under control of the selected digit entry receiving elements by the aforesaid quotient recording means.

3. In a dividing machine, a dividend entry receiving accumulator, a divisor entry receiving means, means for entering dividend and divisor values, cyclically operable means under control of the divisor receiving means for subtracting a divisor value from the dividend accumulator, means for causing said cyclically operable subtracting means to perform successive subtracting operations, a nine-tenths divisor value representing means, means for causing said means to represent a nine-tenths divisor value, normally ineffective means controlled by said nine-tenths divisor value representing means for adding a nine-tenths of the divisor value into said dividend receiving accumulator, a column shift means for determining the denominational routing of subtractive and additive entries into the dividend accumulator, means cooperating with said dividend accumulator for detecting an overdraft therein resulting from successive subtractions of the divisor from the dividend, and means controlled by said overdraft detecting means upon detecting an overdraft for terminating the operation of said cyclically operable subtracting means, for causing operation of the column shift means, and for causing an operation of said nine-tenths divisor adding means to enter nine-tenths of the divisor into the dividend accumulator following column shift, whereby a remainder represented as a true number will be contained in said accumulator.

4. In a machine according to claim 3, a quotient counter member, means for advancing said member unit by unit, and means effective upon subtractions of the divisor from the dividend accumulator not resulting in an overdraft, and upon addition of nine-tenths of the divisor in said accumulator for enabling said advancing means.

5. In a dividing machine, a dividend entry receiving accumulator, a divisor entry receiving means, means for entering dividend and divisor values, cyclically operable means under control of the divisor receiving means for subtracting a divisor value from the dividend accumulator, means for causing said cyclically operable subtracting means to perform successive subtracting operations a nine-tenths divisor value representing means, means for computing a nine-tenths divisor value in said last representing means upon entry of a divisor value, normally ineffective means controlled by said nine-tenths divisor value representing means for adding a nine-tenths of the divisor value into said dividend receiving accumulator, a column shift device for determining the denominational routing of subtractive and additive entries into the dividend accumulator, means cooperating with said dividend accumulator for detecting an overdraft therein resulting from successive subtractions of the divisor from the dividend, and means controlled by said overdraft detecting means upon detecting an overdraft for terminating the operation of said cylically operable subtracting means, for causing operation of the column shift means, and for causing an operation of said nine-tenths divisor adding means to enter nine-tenths of the divisor into the dividend accumulator following column shift, whereby a remainder represented as a true number will be contained in said accumulator.

6. In a dividing machine, a dividend accumulator, a divisor receiving means and a nine-tenths divisor representing means, entry effecting devices for said accumulator and each of said means, means for controlling the entry effecting devices of said accumulator to enter a dividend therein, and for controlling the entry effecting devices of said divisor receiving means and the nine-tenth divisor representing means to enter a divisor therein, means controlled by said divisor receiving means to cause said entry effecting means for said nine-tenths divisor representing means to subtract one-tenth of the divisor therefrom whereby the nine-tenth divisor value is formed in said representing means, means controlled by said divisor receiving means to cause the entry effecting means of the dividend accumulator to subtract divisor values from said accumulator, means for causing said last named means to perform successive subtracting operation until an overdraft occurs in the dividend accumulator, overdraft detecting means, a column shift mechanism, and means controlled by said detecting means for terminating successive subtracting operations, for causing operation of the column shift mechanism and for causing said dividend accumulator entry effecting means to add a nine-tenths divisor value under control of the nine-tenths divisor value representing means in a displaced decimal relation whereby a remainder represented as a true number will be standing in the dividend accumulator.

7. In a dividing machine, a dividend accumulator, a divisor receiving means, means for entering dividend and divisor values in said accumulator and divisor receiving means, respectively, means for computing and representing a nine-tenths divisor value based on the divisor entered into said divisor receiving means, means under control of said representing means for effecting entries of nine-tenths divisor values into the dividend accumulator, means controlled by the divisor receiving means for entering the divisor values into the dividend accumulator whereby an overdraft is obtained therein to determine a quotient digit, a column shift device, overdraft detecting means cooperating with said accumulator for detecting an overdraft therein, and means controlled by said overdraft detecting means for terminating the operation of the entering means controlled by the divisor receiving means, for causing operation of the column shift device, and for causing an operation of the nine-tenths divisor entering means to effect an entry of nine-tenths divisor value into the dividend accumulator under control of said representing means, whereby said accumulator will contain a remainder value which may be utilized in further quotient digit determination.

8. A machine according to claim 3 in which the dividend accumulator receives dividend entries in certain digital orders and in which other digital orders are utilized for quotient representation, and transfer mechanism intermediate the dividend receiving orders and quotient representing orders, said transfer mechanism being effective for entering a quotient unit in the quotient representing orders, upon subtractions of divisor values from the dividend not resulting in an overdraft and upon addition of the nine-tenths divisor value into the dividend accumulator.

9. In a machine according to claim 3 in which the dividend accumulator receives dividend entries in certain digital orders and in which other orders of said accumulator are utilized for quotient representation, means for subtracting a unit from the highest digital order utilized for quotient representation, transfer mechanism intermediate the dividend receiving orders and quotient representing orders, said transfer mechanism being effective for entering a quotient unit in the quotient representing orders, upon subtractions of divisor values from the dividend not resulting in an overdraft and upon addition of the nine-tenths divisor value into the dividend accumulator.

10. A dividing machine comprising a dividend accumulator for receiving dividend entries, divisor receiving means for receiving divisor entries and a nine-tenths divisor computing and representing means, a quotient representing device wherein the quotient is formed digit by digit, entry effecting means for said accumulator, column shift means associated with said entry effecting means, overdraft detecting means for detecting an overdraft in said accumulator, cycle control mechanism for controlling successive quotient digit determinations, said cycle control mechanism for each digit of the quotient causing said entry effecting means to subtract successively divisor values from the dividend accumulator under control of the divisor receiving means until an overdraft is obtained, means controlled by the overdraft detecting means for terminating subtracting operations, for normally causing a column shift and for causing said entry effecting means to normally add a nine-tenths divisor value under control of said representing means, settable means to determine the number of digits in the quotient, and means controlled by said settable means and by said overdraft detecting means when an overdraft is detected during formation of the last quotient digit, to suppress a column shift following overdraft, and to cause said entry effecting means to add the divisor value into the dividend accumulator under control of the divisor receiving means, whereby the true remainder value is obtained therein.

11. A machine according to claim 10 wherein said quotient representing device comprises digital orders of the dividend accumulator, said dividend accumulator receiving dividend entries in certain digital orders thereof, other orders remaining clear to receive the highest digital values of the quotient, tens transfer means for said dividend accumulator, said tens transfer means being utilized for entry of quotient units upon each divisor subtraction not resulting in overdraft and upon addition of a nine-tenths divisor value into the dividend accumulator, the successive quotient digits being formed in accumulator orders initially utilized for dividend entry as the dividend amount is reduced by successive subtractions of the divisor therefrom.

12. A machine according to claim 10 wherein supplementary means are provided, which means cooperates with said settable means and overdraft detecting means when said settable means is set for a single digit quotient, and when an overdraft occurs upon the first divisor subtraction, to disable the column shift suppressing means so as to enable column shift and to cause said entry effecting means to enter a nine-tenths divisor value under control of said representing means instead of a divisor value.

13. In a calculating machine for performing the calculation of division and recording the quotient results, means for recording the quotient digit results upon a record digit by digit, a quotient representing means wherein the quotient digits are formed for controlling said recording means, a dividend accumulator, a plurality of elements associated with digital orders of said accumulator and responsive in succession to the successive overdrafts effected in said dividend accumulator during the determination of successive quotient digits, means selectively settable to a plurality of positions for determining the number of quotient digits to be formed and recorded, and means operable under control of said settable means when set for desired number of quotient digits and under control of one of said elements which is responsive to the last overdraft in the dividend accumulator, for initiating the operation of said quotient result recording means.

14. In a dividing machine in which division computations are effected under control of a dividend accumulator and a divisor entry receiving means, record reading means for controlling dividend and divisor entries into said accumulator and said receiving means, respectively, means for forming and representing quotients in the higher orders of said dividend accumulator as the dividend value entered therein is diminished in denomiatical magnitude in the course of division operation, a recording means for recording the quotient digit by digit, means for controlling elements of said recording means from said dividend accumulator for causing quotient recording on said record, and means for initiating a recording operation when the quotient is formed.

15. A machine for performing division comprising a dividend receiving accumulator, a divisor receiving means, a double read out device controlled by said divisor receiving means comprising one set of elements for reading out a divisor value as a direct number, and a second set of elements for reading out a tens complement thereof, means for effecting entries in said accumulator, means for causing said entry effecting means to successively enter the tens complement of the divisor under control of said second set of elements, overdraft detecting means for detecting an overdraft in said accumulator, means controlled by said detecting means when an overdraft occurs in said accumulator for terminating operation of said entry effecting means under control of said second set of elements, and for causing said entry effecting means to enter a divisor value under control of said first set of elements, whereby a remainder represented as a true number is obtained in said accumulator.

16. In a calculating machine for effecting division, an accumulator comprising dividend receiving digital orders and quotient representing digital orders, a divisor entry receiving means, a nine-tenths divisor representing means, means for causing a nine-tenths divisor representation therein for representing a nine-tenths divisor value, entry effecting means for said accumulator and said receiving means, respectively, means for controlling said entry effecting means to cause dividend and divisor entries respectively, cyclically operable means for causing the entry effecting means of said dividend accumulator to successively enter the complement of the divisor value into said dividend accumulator under control of the divisor receiving means, overdraft detecting means controlled by said accumulator for detecting an overdraft resulting from successive complementary entries, tens transfer means in said accumulator for entering units in said quotient representing digital orders one unit for each successive complemental entry not resulting in an overdraft, means controlled by said overdraft detecting means when an overdraft is detected for causing said accumulator entry effecting means to enter a nine-tenths divisor value under control of the nine-tenths divisor value representing means, said tens transfer means effecting an additional unit entry into the quotient representing means as a result of said nine-tenths divisor entry, and means for causing subtraction of a unit value from the quotient representing means to compensate for said additional unit entry.

17. A machine according to claim 16 wherein the means for causing the nine-tenths divisor representing means to represent a nine-tenths divisor value comprises, means for effecting entries in said nine-tenths divisor representing means, means for controlling said entry effecting means to enter a divisor value, and means for controlling said entry effecting means to subtract a one-tenth divisor value.

18. A machine according to claim 6 wherein the means for controlling the entry of the dividend and divisor values comprise record sensing devices and entry routing devices, and wherein the dividend accumulator consists of dividend receiving digital orders and quotient representing digital orders, means for presensing the denominational magnitude of the dividend and divisor representations on the record, and means for controlling said routing devices by said presensing means so that said routing devices will always route the highest dividend digit into the highest dividend receiving order of the dividend accumulator, and the highest digit of the divisor in the highest order of the divisor receiving means.

19. In a dividing machine, a plurality of denominationally ordered means each positionable to a particular digit representing position from a dividend accumulator for detecting an overdraft condition in said accumulator, devices for shifting the control for overdraft detection from each of said means to the means next lower in denominational order, and means controlled by each of the aforesaid denominationally ordered means and operable when positioned to said particular digit representing position for causing the operation of said shifting devices.

20. In a dividing machine, an accumulator comprising several denominationally ordered elements which represent a dividend entry and certain of which when positioned to represent a particular value signify an overdraft condition in said accumulator, a plurality of control relays each of which is energizable under control of the related element when the later is utilized to signify an overdraft condition in said accumulator means for effecting successive energization of respective relays, and means controlled by a relay of higher order when energized for causing the relay of next lower order to be energized by said energization effecting means when the related element signifies an overdraft condition.

21. In a dividing machine, an accumulator comprising several denominationally ordered elements which represent a dividend entry and certain of which when positioned to represent a particular value signify an overdraft condition in said accumulator, a plurality of column shift control relays each of which is energizable under control of the related element when the latter is utilized to signify an overdraft condition in said accumulator, means for effecting successive energization of respective column shift relays, and means controlled by a column shift control relay of higher order when energized for causing the column shift relay of next lower order to be energized by said energization effecting means when the related element signifies an overdraft condition.

22. In a dividing machine, means for analyzing records having designations representing dividend values and divisor values, record sensing means for detecting and determining the denominational magnitude of the values designated on the records, dividend entry receiving means comprising an accumulator consisting of dividend receiving digital orders, a divisor entry receiving means consisting of divisor receiving digital orders, separate entering means under control of said analyzing means for the respective entry receiving means, entry routing means intermediate the analyzing means and each entry receiving means comprising pyramidically arranged contacts for directing the entries effecting by the entering means under control of the analyzing means into higher orders of the correlated entry receiving means when the number of digits in the values designated on the record is equal to or less than the number of denominational order in said correlated entry receiving means, and a plurality of contact operating means controlled by said sensing means for positioning said contacts so as to direct the dividend and divisor values in the respective receiving means in the manner aforesaid.

23. In a calculating machine, dividing mechanism which comprises dividend entry receiving means receiving dividend values of varying denominational magnitude, divisor receiving means receiving divisor values of varying denominational magnitude, quotient receiving means, said quotient receiving means receiving undenominated quotient results of the division calculations performed under control of said divisor receiving means and said dividend entry receiving means, means for sensing representations of said values for detecting the denominational magnitudes of the dividend values and divisor values which may be of varying denominational magnitude for different calculations, divisor and dividend entering means, entry diverting means controlled by said sensing means for automatically causing the divisor and dividend to be entered by the related entering means into the higher orders of said divisor and dividend receiving means, respectively, quotient recording means controlled by said quotient receiving means, a plurality of diverting means associated with said recording means and said quotient receiving means for selecting the denominational columns for quotient recording by the aforesaid quotient recording means, selecting means set up under control of said sensing means for controlling one of said diverting means to cause the latter to select in accordance with the denominational magnitude of the dividend value the higher denominational columns for quotient recording, and for controlling the other of said diverting means to cause the latter to select in accordance with the denominational magnitude of the divisor value lower denominational columns for quotient recording, said separate diverting means conjointly selecting and determining the final denominational columns for denominating quotient recording dependent upon the relative denominational magnitudes of both the divisor and dividend values, and means for causing the set up of said selecting means to be retained during the quotient recording operation.

JAMES W. BRYCE.
ARTHUR H. DICKINSON.